US012615393B2

(12) United States Patent
Zhang et al.

(10) Patent No.: US 12,615,393 B2
(45) Date of Patent: Apr. 28, 2026

(54) VIDEO DATA PROCESSING METHOD AND APPARATUS, STORAGE MEDIUM, DEVICE, AND PROGRAM PRODUCT

(71) Applicant: Tencent Technology (Shenzhen) Company Limited, Guangdong (CN)

(72) Inventors: Han Zhang, Shenzhen (CN); Hongbin Zhang, Shenzhen (CN); Wei Kuang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 8 days.

(21) Appl. No.: 18/991,972

(22) Filed: Dec. 23, 2024

(65) Prior Publication Data

US 2025/0126295 A1    Apr. 17, 2025

Related U.S. Application Data

(63) Continuation of application No. PCT/CN2023/106304, filed on Jul. 7, 2023.

(30) Foreign Application Priority Data

Dec. 9, 2022    (CN) .......................... 202211580064.1

(51) Int. Cl.
　　*H04N 19/65* 　　(2014.01)
　　*H04N 19/14* 　　(2014.01)
　　*H04N 19/80* 　　(2014.01)
(52) U.S. Cl.
　　CPC ............. *H04N 19/65* (2014.11); *H04N 19/14* (2014.11); *H04N 19/80* (2014.11)
(58) Field of Classification Search
　　None
　　See application file for complete search history.

(56) References Cited

U.S. PATENT DOCUMENTS 12,531,574 B2 * 1/2026 Fenney ............... H03M 7/3059
12,535,589 B2 * 1/2026 Thun-Hohenstein ........................
　　　　　　　　　　　　　　　　　　　　　G01S 17/894

(Continued)

FOREIGN PATENT DOCUMENTS

CN　　　105338363 A　　2/2016
CN　　　109688411 A　　4/2019

(Continued)

OTHER PUBLICATIONS

International Search Report for PCT/CN2023/106304 dated Oct. 12, 2023.
Written Opinion for PCT/CN2023/106304 dated Nov. 1, 2023.

*Primary Examiner* — Jared Walker
(74) *Attorney, Agent, or Firm* — Sughrue Mion, PLLC

(57) ABSTRACT

A video data processing method, performed by a computer device, includes: obtaining reconstructed video data; obtaining one or more candidate pixel threshold pairs, wherein at least one of the one or more candidate pixel threshold pairs include two candidate pixel thresholds having first relationship that is asymmetric; determining one or more distortion costs associated with correcting a target reconstructed video frame of the reconstructed video data in a target correction mode according to the one or more candidate pixel threshold pairs; screening, according to the one or more distortion costs, a target pixel threshold pair of the reconstructed video data, in the target correction mode, from the one or more candidate pixel threshold pairs; and obtaining a target correction result of the reconstructed video data by correcting, in the target correction mode according to the target pixel threshold pair, one or more reconstructed video frames of the reconstructed video data.

20 Claims, 7 Drawing Sheets

(56)          References Cited

U.S. PATENT DOCUMENTS

| | | | |
|---|---|---|---|
| 2009/0316797 A1 | 12/2009 | Woo et al. | |
| 2014/0341273 A1* | 11/2014 | Ye ........................ | H04N 19/537 |
| | | | 375/240.02 |
| 2016/0360235 A1* | 12/2016 | Ramasubramonian ...................... | |
| | | | H04N 19/587 |
| 2020/0236355 A1* | 7/2020 | Zhao ................... | H04N 19/157 |

FOREIGN PATENT DOCUMENTS

| | | |
|---|---|---|
| CN | 110383837  A | 10/2019 |
| CN | 111669589  A | 9/2020 |

* cited by examiner

*LCU:* Largest coding unit

*CU:* Coding unit (picture block)

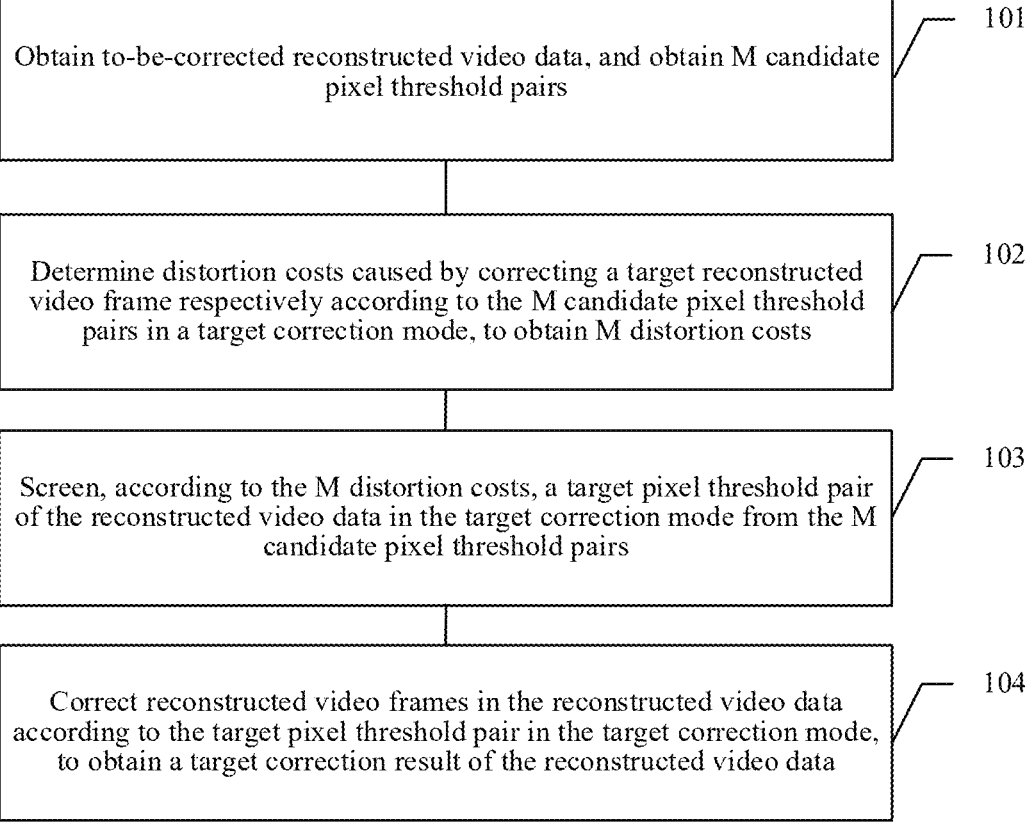

Obtain to-be-corrected reconstructed video data, and obtain M candidate pixel threshold pairs — 101

Determine distortion costs caused by correcting a target reconstructed video frame respectively according to the M candidate pixel threshold pairs in a target correction mode, to obtain M distortion costs — 102

Screen, according to the M distortion costs, a target pixel threshold pair of the reconstructed video data in the target correction mode from the M candidate pixel threshold pairs — 103

Correct reconstructed video frames in the reconstructed video data according to the target pixel threshold pair in the target correction mode, to obtain a target correction result of the reconstructed video data — 104

FIG. 5

VIDEO DATA PROCESSING METHOD AND APPARATUS, STORAGE MEDIUM, DEVICE, AND PROGRAM PRODUCT

CROSS-REFERENCE TO RELATED APPLICATIONS

This application is a continuation application of International Application No. PCT/CN2023/106304 filed on Jul. 7, 2023, which claims priority to Chinese Patent Application No. 202211580064.4, entitled filed with the China National Intellectual Property Administration on Dec. 9, 2022, the disclosures of each being incorporated by reference herein in their entireties.

FIELD

The disclosure relates to the field of data processing technologies, and in particular, to video data processing.

BACKGROUND

Digital video technologies can be incorporated into video apparatuses, such as televisions, smartphones, computers, e-readers, or video players, for example. With the development of these technologies, larger amounts of video data are increasingly being used. To facilitate transmission of video data, video apparatuses may use coding and compression techniques to more efficiently transmit or store video data.

Currently, in multimedia data processing, an encoding device may perform coding, transform, or quantization operations on original video to obtain coded video, and operations such as inverse quantization, inverse transform, or predictive compensation may be performed on the coded video to obtain reconstructed video. Compared with the original video, due to the effects of the quantization, some information in the reconstructed video may be different from the original, resulting in distortion. The reconstructed video may be filtered to reduce the degree of these distortions; however, in practice, the accuracy of these types of corrections may be relatively low, resulting in low-quality reconstructed video.

SUMMARY

Provided are a video data processing method and apparatus, a storage medium, a device, and a program product, capable of correcting reconstructed video data.

According to some embodiments, a video data processing method, performed by a computer device, includes: obtaining reconstructed video data; obtaining one or more candidate pixel threshold pairs, wherein at least one of the one or more candidate pixel threshold pairs include two candidate pixel thresholds having first relationship that is asymmetric; determining one or more distortion costs associated with correcting a target reconstructed video frame of the reconstructed video data in a target correction mode according to the one or more candidate pixel threshold pairs; screening, according to the one or more distortion costs, a target pixel threshold pair of the reconstructed video data, in the target correction mode, from the one or more candidate pixel threshold pairs; and obtaining a target correction result of the reconstructed video data by correcting, in the target correction mode according to the target pixel threshold pair, one or more reconstructed video frames of the reconstructed video data.

According to some embodiments, a video data processing apparatus, includes: at least one memory configured to store computer program code; and at least one processor configured to read the program code and operate as instructed by the program code, the program code including: first obtaining code configured to cause at least one of the at least one processor to obtain reconstructed video data; second obtaining code configured to cause at least one of the at least one processor to obtain one or more candidate pixel threshold pairs, wherein at least one of the one or more candidate pixel threshold pairs include two candidate pixel thresholds having a first relationship that is asymmetric; first determining code configured to cause at least one of the at least one processor to determine one or more distortion costs associated with correcting a target reconstructed video frame of the reconstructed video data in a target correction mode according to the one or more candidate pixel threshold pairs; first screening code configured to cause at least one of the at least one processor to screen, according to the one or more distortion costs, a target pixel threshold pair of the reconstructed video data, in the target correction mode, from the one or more candidate pixel threshold pairs; and third obtaining code configured to cause at least one of the at least one processor to obtain a target correction result of the reconstructed video data by correcting, in the target correction mode according to the target pixel threshold pair, one or more reconstructed video frames of the reconstructed video data.

According to some embodiments, a non-transitory computer-readable storage medium, storing computer code which, when executed by at least one processor, causes the at least one processor to at least: obtain reconstructed video data; obtain one or more candidate pixel threshold pairs, wherein at least one of the one or more candidate pixel threshold pairs include two candidate pixel thresholds having a first relationship that is asymmetric; determine one or more distortion costs associated with correcting a target reconstructed video frame of the reconstructed video data in a target correction mode according to the one or more candidate pixel threshold pairs; screen, according to the one or more distortion costs, a target pixel threshold pair of the reconstructed video data, in the target correction mode, from the one or more candidate pixel threshold pairs; and obtain a target correction result of the reconstructed video data by correcting, in the target correction mode according to the target pixel threshold pair, one or more reconstructed video frames of the reconstructed video data.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 5 is a schematic flowchart of a video data processing method according to some embodiments.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

The disclosure relates to the field of cloud technologies. Cloud computing is a computing mode, in which computing tasks are distributed on a resource pool formed by a large quantity of computers, so that various application systems can obtain computing power, storage space, and information services. A network that provides resources is referred to as a "cloud". For a user, resources in a "cloud" seem to be infinitely expandable, and can be obtained readily, used on demand, and expanded readily. Reconstructed video data may be corrected through cloud computing.

Figure 1:
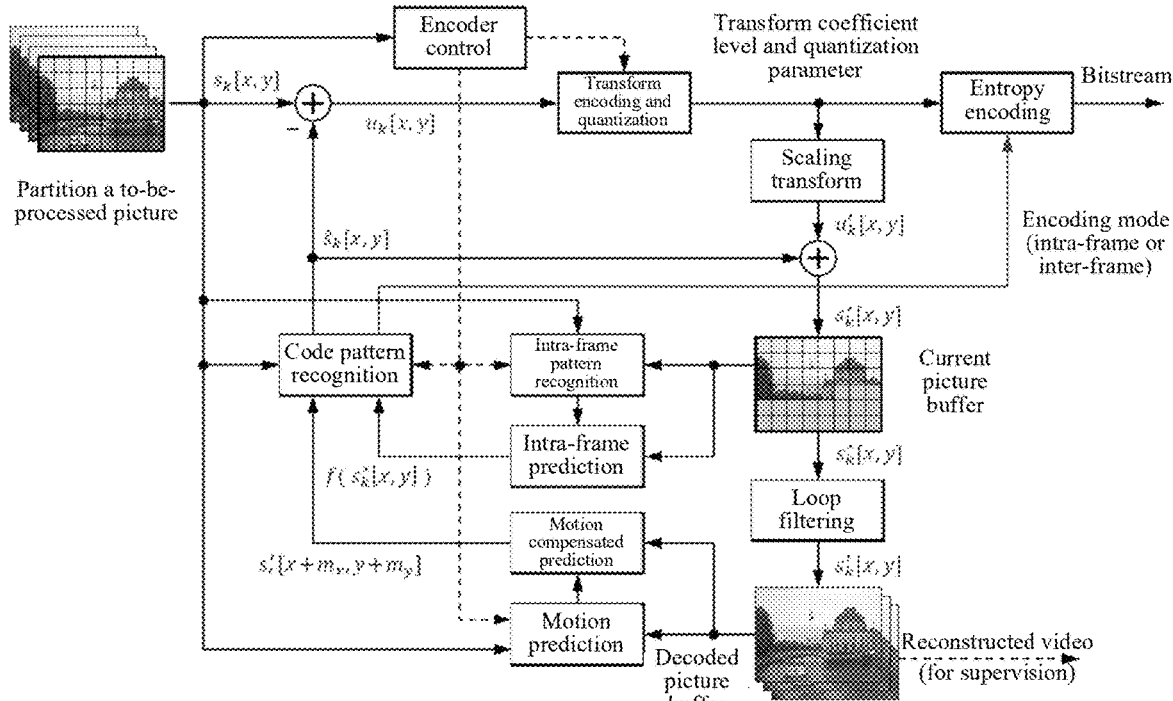
FIG. 1 is a schematic diagram of a video data processing process according to some embodiments.
Figure 2:
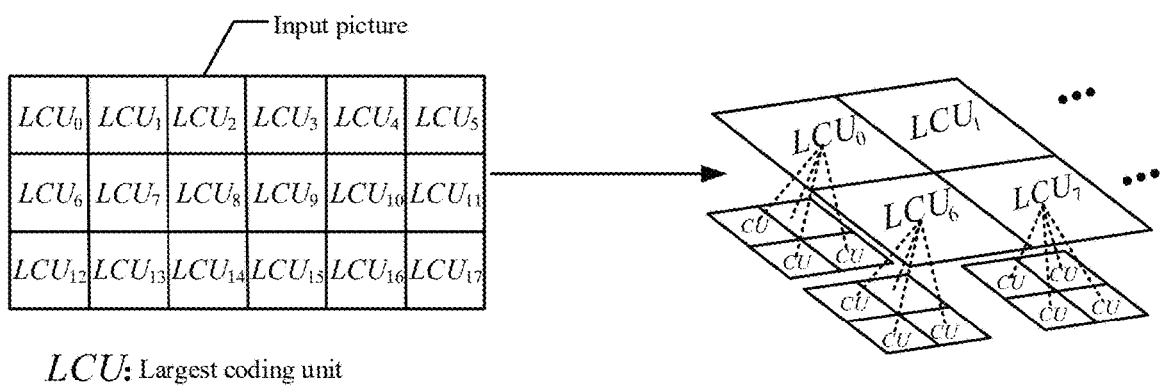
FIG. 2 is a schematic diagram of a coding unit according to some embodiments.

Some embodiments relate to a technology for processing video data. Processing the video data may include: video capture, video encoding, video file encapsulation, video transmission, video file decapsulation, video decoding, and final video presentation. Video capture is configured to convert an analog video into a digital video and store the digital video in a format of a digital video file. For example, video capture can convert a video signal into binary digital information. The binary information into which the video signal is converted is a binary data stream. The binary information may also be referred to as a bit stream or a bitstream of the video signal. Video encoding is to convert a file in an original video format into a file in another video format through a compression technology. In some embodiments, generation of video media content is mentioned, including a real scene captured and generated by a camera and a screen content scene generated by a computer. In view of a manner of obtaining a video signal, the video signal may be divided into two manners: captured by a camera and generated by a computer. Compression coding methods corresponding to different statistical characteristics may also differ. Modern mainstream video coding technologies, for example, international video coding standard: High Efficiency Video Coding (HEVC, international video coding standard HEVC/H.265), versatile video coding (VVC, international video coding standard VVC/H.266), Audio Video Coding Standard (AVS), or a third-generation audio video coding standard pushed out by the AVS standard group (AVS3), uses a hybrid coding framework. The following series of operations and processing are performed on an inputted original video signal. FIG. 1 is a schematic diagram of a video data processing process according to some embodiments. Details may be shown in FIG. 1:

1. Block partition structure: An input picture (for example, a video frame in video data) is partitioned into several non-overlapping processing units according to a size, and each processing unit is subject to a similar compression operation. This processing unit is referred to as a Coding Tree Unit (CTU) or a Largest Coding Unit (LCU). The Coding Tree Unit may be partitioned downward from the Largest Coding Unit, and the CTU may be partitioned downward more finely, to obtain one or more basic coding units, which are referred to as coding units (CUs). Each CU is the most basic element in a coding link. The following describes various coding modes that may be configured for each CU. FIG. 2 is a schematic diagram of a coding unit according to some embodiments. A relationship between an LCU (or CTU) and a CU may be shown in FIG. 2. As shown in FIG. 2, an input picture may be partitioned into a plurality of LCUs, for example, the input picture may be partitioned into 18 LCUs. Further, Each LCU may be partitioned into a plurality of CUs, for example, each LCU is partitioned into 4 CUs. A target reconstructed pixel point, a reconstructed pixel point, and a reference pixel point in some embodiments may refer to CUs.

2. Predictive Coding: It includes manners such as intra-frame prediction and inter-frame prediction. An original video signal is predicted from a selected reconstructed video signal to obtain a residual video signal. An encoding end may determine, for the current CU, one of a plurality of predictive coding modes, and inform a decoding end.

a. Intra (picture) Prediction: A predicted signal comes from a region that has been encoded and reconstructed in the same picture.

b. Inter (picture) Prediction: A predicted signal comes from another picture (referred to as a reference picture) that has been encoded and is different from the current picture.

3. Transform & Quantization: A residual video signal is transformed into a transform domain through a transform operation such as Discrete Fourier Transform (DFT) or discrete cosine transform (DCT, which is a subset of DFT), which is referred to as a transform coefficient. A lossy quantization operation is further performed on a signal in the transform domain, and some information is lost, so that the quantized signal is conducive to compressed expression.

In some video coding standards, two or more transform manners may be selected. Therefore, the encoding end may select one of the transform manners for the currently coded CU, and inform the decoding end. A fineness of quantization is usually determined by a Quantization Parameter (QP). A larger value of QP indicates that coefficients in a larger value range are to be quantized into the same output, which therefore usually brings more distortion and a lower bit rate. On the contrary, a smaller value of QP indicates that coefficients in a smaller value range are to be quantized into the same output, which therefore usually brings less distortion and corresponds to a higher bit rate.

4. Entropy Coding or statistical coding: Statistical compression coding is performed on quantized transform-domain signals according to frequencies of occurrence of values, and a binarized (0 or 1) compressed bit stream may be output. In addition, entropy coding may be performed on other information generated through encoding, such as a selected mode and a motion vector, to reduce a bit rate.

Statistical coding is a lossless coding mode that may reduce a bit rate for expressing a same signal. Statistical coding modes may include Variable Length Coding (VLC) or Content Adaptive Binary Arithmetic Coding (CABAC).

5. Loop Filtering: Operations of inverse quantization, inverse transform, and predictive compensation (reverse operations of the foregoing ② to ④) are performed on a picture that has been encoded, to obtain a reconstructed decoded picture. Compared with the original picture, due to impact of quantization on the reconstructed picture, some information is different from that of the original picture, resulting in distortion. By performing a filtering operation on the reconstructed picture, a degree of distortion caused by quantization may be reduced. Because these filtered reconstructed pictures are used as references for subsequently encoded pictures to predict future signals, the foregoing filtering operation is also referred to as loop filtering and a filtering operation within an encoding loop.

Figure 3:
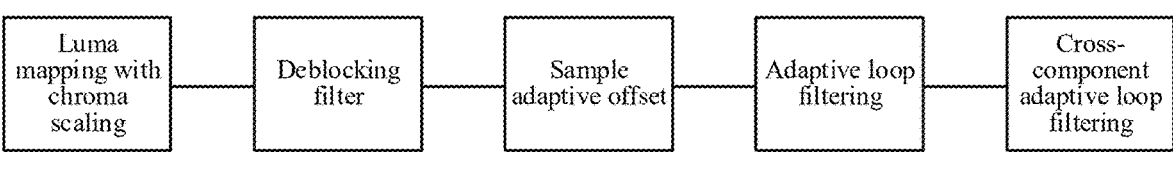
FIG. 3 is a schematic diagram of a loop filtering manner according to some embodiments.

FIG. 3 is a schematic diagram of a loop filtering manner according to some embodiments. As shown in FIG. 3, FIG. 3 is a loop filtering process of the latest generation international video coding standard VVC, including a total of five modules, for example, Luma Mapping with Chroma Scaling (LMCS), Deblocking Filter (DBF), Sample adaptive offset (SAO), adaptive loop fitter (ALF), and Cross-Component Adaptive Loop Filtering (CC-ALF). The LMCS is not targeted at specific encoding distortion, and may improve encoding efficiency based on a corresponding sample value interval. The DBF and the SAO are configured to reduce distortion caused by an encoding process. The DBF is configured to alleviate a discontinuity at a boundary between blocks caused by a block-based operation. The SAO adaptively compensates each pixel sample with an offset value to alleviate a difference from an original pixel caused by a quantization operation. As newly received loop filters in the VVC, the ALF and the CC-ALF are a type of Wiener filters, and adaptively determine filter coefficients according to content of different video components, thereby reducing a mean square error (MSE) between a reconstructed component and an original component. The ALF has an input that is a reconstructed pixel value filtered by the DBF and the SAO, and an output that is a reconstructed luma picture and a reconstructed chroma picture that are enhanced. The CC-ALF is only applied to the chroma component. By using a correlation between the luma component and the chroma component, a corrected value of the chroma component is obtained through linear filtering on the luma component, and the corrected value plus the chroma component passing through the ALF is used as a final reconstructed chroma component. The CC-ALF has an input that is a luma component after passing through the DBF and the SAO and before passing through the ALF, and an output that is a corrected value of a corresponding chroma component. As an adaptive filter, the Wiener filter can generate different filtering coefficients for video content with different characteristics. Therefore, the ALF and the CC-ALF may classify the video content, and use corresponding filters for various categories of video content. In current VVC design, the luma ALF supports 25 different categories of filters, the ALF of each chroma component supports a maximum of 8 different categories of filters, and the CC-ALF of each chroma component supports a maximum of 4 different categories of filters.

Figure 4:
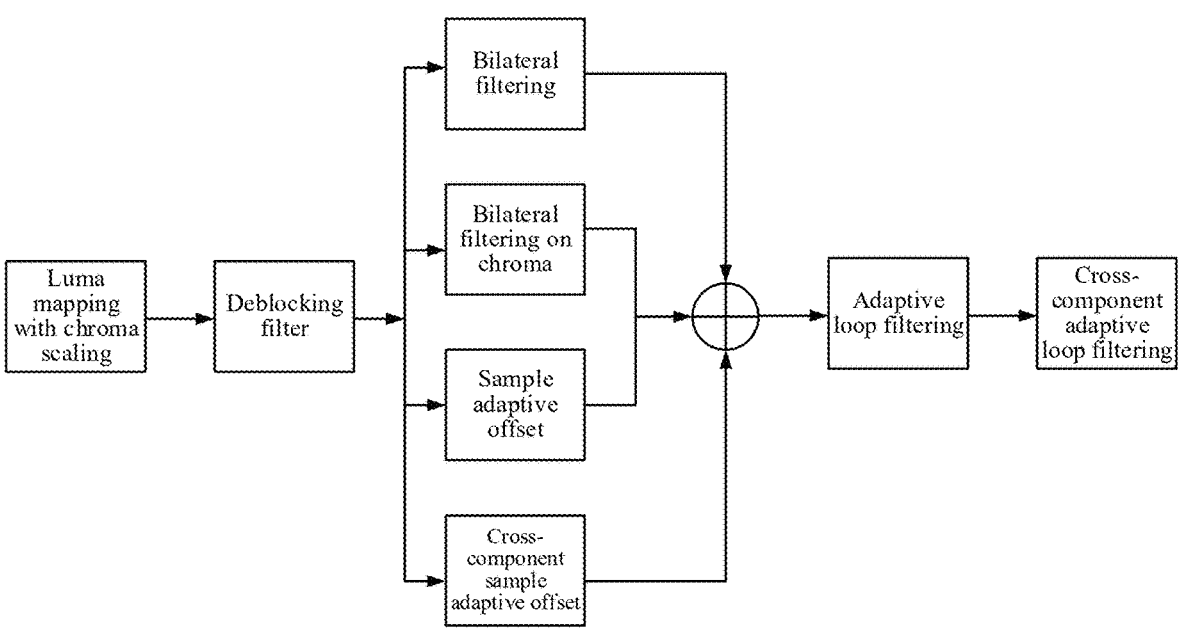
FIG. 4 is a schematic diagram of a loop filtering manner according to some embodiments.

Based on the VVC, a further enhanced compression model (ECM) has been explored and researched. In addition to continuing to use the existing loop filter in the VVC, a plurality of loop filters are additionally introduced into the loop filtering part of the ECM. FIG. 4 is a schematic diagram of a loop filtering manner according to some embodiments. As shown in FIG. 4, FIG. 4 shows a loop filtering process of an ECM. Compared with the loop filtering of the VVC, bilateral filter (BIF), bilateral filter on chroma (BIF-Chroma), and Cross-Component Sample Adaptive Offset (CCSAO) are newly introduced loop filters in the ECM, and operate in parallel with the SAO, so that a correction value generated and a correction value generated by the SAO are simultaneously added to a reconstructed pixel that has been subject to deblocking filtering.

The CCSAO is used as a newly introduced loop filter in the ECM. The CCSAO is similar to the SAO. Inputted reconstructed pixels are divided into different categories, a corresponding correction value/offset value is generated for each category, and the correction value is added to a reconstructed pixel belonging to a corresponding category, thereby reducing a difference between the reconstructed pixel and the original pixel. The SAO uses only the reconstructed pixel value of the current to-be-processed color component for classification. The CCSAO can use reconstructed pixel values of all three color components (for example, the Y pixel component, the U pixel component, and the V pixel component) for classification for any to-be-processed color component. For ease of parallel processing, an output of the deblocking filtering may be used as an input of the CCSAO. The CCSAO also includes two offset types: band offset (BO) and edge offset (EO).

For the BO type in the CCSAO, the CCSAO directly performs classification according to the reconstructed pixel values for classification. For a reconstructed pixel value corresponding to any luma/chroma, reconstructed pixel values {a co-located Y pixel, a co-located U pixel, and a co-located V pixel} of corresponding three color components are configured for classification simultaneously. The three reconstructed pixel values for classification are first divided into respective band categories {$band_Y$, $band_U$, $band_V$}, and then a combined category indicator is generated according to the band categories of the three color components as the BO category of the current to-be-processed input reconstructed pixel. For each BO category, an offset value may be generated and added to the input reconstructed pixel. The band category is obtained by dividing a picture pixel value range (for example, 0 to 255) into x equal parts (for example, 32 equal parts), and a process of obtaining the BO category is shown in Formula (1).

$$band_Y = (Y_{col} \cdot N_Y) \gg BD \qquad (1)$$

$$band_U = (U_{col} \cdot N_U) \gg BD$$

$$band_V = (V_{col} \cdot N_V) \gg BD$$

$$i = band_Y \cdot (N_U \cdot N_V) + band_U \cdot N_V + band_V$$

$$C'_{rec} = Clip1(C_{rec} + \sigma_{CCSAO}[i])$$

where {$Y_{col}$, $U_{col}$, $V_{col}$} respectively represent co-located reconstructed pixel values of three color components for classification, $\{N_Y, N_U, N_V\}$ represents a total quantity of band categories during band division of the three color components, BD represents a pixel value bit depth, and i is a category index jointly generated by the three color components, and is a BO category of the current to-be-processed input reconstructed pixel. $C_{rec}$ and $C_{rec}'$ represent reconstructed pixels before and after the CCSAO respectively. $\sigma_{CCSAO}[i]$ is the correction/offset value corresponding to the band category i.

A basic process of a video encoder is shown in FIG. 1. A $k^{th}$ CU (marked as Sk[x, y]) is used as an example for description in FIG. 1, where k is a positive integer greater than or equal to 1 and less than or equal to a quantity of CUs in the inputted current picture, Sk[x, y] represents a pixel point with coordinates [x, y] in the $k^{th}$ CU, x represents a horizontal coordinate of the pixel point, and y represents a vertical coordinate of the pixel point. Sk[x, y] is subject to one type of processing such as motion compensation or intra-frame prediction to obtain a predicted signal $\widehat{S_k}$ [x, y].

$\widehat{S_k}$ [x, y] is subtracted from Sk[x, y] to obtain a residual signal Uk[x, y], and then the residual signal Uk[x, y] is transformed and quantized. Data output by quantization has two different destinations: One application is to be sent to an entropy encoder for entropy encoding, and an encoded bit stream is output to a buffer for storage and waiting to be sent out. The other application is to be subject to inverse quantization and inverse transform to obtain a signal U'k[x, y]. The signal U'k[x, y] is added to $\widehat{S_k}$ [x, y] to obtain a new predicted signal S*k[x, y], and S*k[x, y] is sent to a buffer of the current picture and stored. S*k[x, y] is subject to intra-picture prediction to obtain f (S*k[x, y]), S*k[x, y] is subject to loop filtering to obtain S'k[x, y], and S'k[x, y] is sent to a buffer of a decoded picture and stored, to generate corrected reconstructed video data. S'r[x+mx, y+my] is subject to motion-compensated prediction to obtain S'k[x, y], where S'r[x+mx, y+my] represents a reference block, and mx and my represent horizontal and vertical components of a motion vector respectively.

After the video data is encoded, a data stream obtained after encoding may be encapsulated and transmitted to a user. Video file encapsulation refers to storing, according to an encapsulation format (or a container, or a file container), encoded and compressed video and audio in a file according to a format. Encapsulation formats may include an Audio Video Interleaved (AVI) format or an International Standard Organization (ISO) Based Media File Format (ISOBMFF), where the ISOBMFF is an encapsulation standard for a media file, and the ISOBMFF file may be a Moving Picture Experts Group 4 (MP4) file, for example. The encapsulated file is transmitted to a decoding device through a video. After the decoding device performs inverse operations such as decapsulation and decoding, final video content presentation may be performed in the decoding device.

A file decapsulation process of the decoding device is inverse to the foregoing file encapsulation process. The decoding device may decapsulate the encapsulated file based on a file format during encapsulation, to obtain the video bit stream. The decoding process of the decoding device is also inverse to the encoding process. The decoding device may decode the video bit stream to restore the video data. According to the foregoing encoding process, it can be learned that, at a decoding end, for each CU, after obtaining the compressed bit stream, the decoder first performs entropy decoding to obtain various mode information and quantized transform coefficients. Inverse quantization and inverse transform are performed on each coefficient to obtain a residual video signal. In addition, based on known encoding mode information, a predicted signal corresponding to the CU may be obtained, and after the two are added, a reconstructed signal may be obtained. The reconstructed video data of the decoded picture may be subject to a loop filtering operation to obtain corrected reconstructed video data. The corrected reconstructed video data may be used as a final output signal.

FIG. 5 is a schematic flowchart of a video data processing method according to some embodiments. The method may be performed by a computer device, and the computer device may be an encoding device. As shown in FIG. 5, the method may include, but is not limited to, the following operations:

S101: Obtain to-be-corrected reconstructed video data, and obtain M candidate pixel threshold pairs.

The computer device may obtain to-be-corrected reconstructed video data. The to-be-corrected reconstructed video data may be obtained by reconstructing encoded video data. For example, the to-be-corrected reconstructed video data may be obtained by restoring the encoded video data. The encoded video data may be obtained by encoding original video data corresponding to the reconstructed video data. In the process of encoding the original video data, operations such as encoding, transform, and quantization are performed on the original video data to obtain the encoded video data of the original video data, and then operations such as inverse quantization, inverse transform, and predictive compensation are performed on the encoded video data to obtain the reconstructed video data. Compared with the original video data, due to impact of operations such as coding, transform, and quantization on the reconstructed video data, partial information of the reconstructed video data is different from partial information of the original video data, resulting in distortion of the reconstructed video data. Therefore, the computer device may correct the reconstructed video data to reduce a distortion degree of the reconstructed video data. The computer device may perform operations of inverse quantization, inverse transform, and predictive compensation on the encoded video data of the original video data, to obtain to-be-corrected reconstructed video data. The computer device may further obtain M candidate pixel threshold pairs, and there is an asymmetric relationship between two candidate pixel thresholds of at least one candidate pixel threshold pair in the M candidate pixel threshold pairs. For example, a candidate pixel threshold pair including two candidate pixel thresholds respectively corresponding to different absolute values exists in the M candidate pixel threshold pairs. M is a positive integer greater than 1, and M may be 2, 3, 4, or the like.

In some embodiments, the M candidate pixel threshold pairs include a first candidate pixel threshold pair, and two candidate pixel thresholds in the first candidate pixel threshold pair have an asymmetric relationship. For example, the two candidate pixel thresholds in the first candidate pixel threshold pair respectively correspond to different absolute values. For example, the two candidate pixel thresholds in the first candidate pixel threshold pair are a candidate pixel threshold e1 and a candidate pixel threshold e2. The candidate pixel threshold e1 is 1, and the candidate pixel threshold e2 is −2. "1" is asymmetric with "−2", for example, an absolute value "1" of the candidate pixel threshold e1 and an absolute value "2" of the candidate pixel threshold e2 are different. For example, determining any one candidate pixel threshold of any candidate pixel threshold pair is not affected by the other candidate pixel threshold, so that flexibility in determining the candidate pixel threshold of the candidate pixel threshold pair may be improved.

In some embodiments, the two candidate pixel thresholds in the first candidate pixel threshold pair are generated according to different candidate pixel thresholds in a same candidate pixel threshold interval; or the two candidate pixel thresholds in the first candidate pixel threshold pair are generated according to candidate pixel thresholds in different candidate pixel threshold intervals, and the candidate pixel thresholds in the different candidate pixel threshold intervals are different. For example, absolute values of the two candidate pixel thresholds in the first candidate pixel threshold pair may be obtained by selecting different pixel thresholds within the same candidate pixel threshold interval. For example, the candidate pixel threshold e1 in the first candidate pixel threshold pair may be a threshold s11 selected from a candidate pixel threshold interval s1, and the candidate pixel threshold e2 in the first candidate pixel threshold pair may be a threshold s12 selected from the candidate pixel threshold interval s1. The threshold s11 is different from the threshold s12. Absolute values of the two candidate pixel thresholds in the first candidate pixel threshold pair may be obtained through selection from different candidate pixel threshold intervals. Because pixel thresholds in different candidate pixel threshold intervals are different, two selected candidate pixel thresholds are different. For example, the candidate pixel threshold e1 in the first candidate pixel threshold pair may be a threshold s13 selected from a candidate pixel threshold interval s1, and the candidate pixel threshold e2 in the first candidate pixel threshold pair may be a threshold s21 selected from a candidate pixel threshold interval s2. In some embodiments, a candidate pixel threshold interval may include {2, 4, 6, 8, 10, 14, 18, 22, 30, 38, 54, 70, 86, 118, 150, 182}, and a candidate pixel interval may include {1, 3, 5, 7, 9, 11, 13, 15, 17, 19, 25}, for example. Other candidate pixel intervals may also be included, and the disclosure is not limited thereto.

It is assumed that the candidate pixel threshold interval includes {2, 4, 6, 8, 10, 14, 18, 22, 30, 38, 54, 70, 86, 118, 150, and 182}. If only symmetric candidate pixel threshold pairs are generated, a candidate pixel threshold in the candidate pixel threshold interval can only form a candidate pixel threshold pair with an opposite number of the candidate pixel threshold, and 16 symmetric candidate pixel threshold pairs can be obtained. If an asymmetric candidate pixel threshold pair is generated, one candidate pixel threshold within the candidate pixel threshold interval may be combined with opposite numbers of other candidate pixel thresholds to generate a plurality of asymmetric candidate pixel threshold pairs. For example, for the candidate pixel threshold 2, asymmetric pixel threshold pairs (2, −4), (2, −6), (2, −8), and the like may be generated. On the basis of generating an asymmetric candidate pixel pair, a symmetric candidate pixel threshold pair may also be generated. It can be seen that, within the same candidate pixel threshold interval, a quantity of generated symmetric candidate pixel threshold pairs is much less than a quantity of generated asymmetric candidate pixel threshold pairs. In some embodiments, by generating asymmetric candidate pixel threshold pairs, a range of candidate pixel threshold pairs for screening can be expanded, which is conducive to screening of an optimal candidate pixel threshold pair.

In some embodiments, the M candidate pixel threshold pairs further include a second candidate pixel threshold pair, and two candidate pixel thresholds in the second candidate pixel threshold pair have a symmetric relationship. For example, absolute values respectively corresponding to the two candidate pixel thresholds in the second candidate pixel threshold pair are the same. For example, the two candidate pixel thresholds in the second candidate pixel threshold pair are a candidate pixel threshold r1 and a candidate pixel threshold r2. The candidate pixel threshold r1 is 1, and the candidate pixel threshold r2 is −1. "1" is symmetric with "−1", for example, an absolute value "1" of the candidate pixel threshold r1 and an absolute value "1" of the candidate pixel threshold r2 are the same.

In some embodiments, the two candidate pixel thresholds in the second candidate pixel threshold pair are generated according to a same candidate pixel threshold in a same candidate pixel threshold interval. For example, absolute values of the two candidate pixel thresholds in the second candidate pixel threshold pair may be obtained by selecting the same value within the same candidate pixel threshold interval. For example, the candidate pixel threshold r1 in the second candidate pixel threshold pair may be a threshold s31 selected from a candidate pixel threshold interval s3, and the candidate pixel threshold r2 in the second candidate pixel threshold pair may also be a threshold s31 selected from the candidate pixel threshold interval s3.

It can be learned that the two candidate pixel thresholds included in the candidate pixel threshold pair in the M candidate pixel threshold pairs may or may not have a symmetric relationship. The M candidate pixel threshold pairs may be obtained by randomly combining values in one or more candidate pixel threshold intervals. It can be seen that the M candidate pixel threshold pairs cover a wide range, so that an accurate target pixel threshold pair (for example, an optimal pixel threshold pair) can be determined subsequently, which may improve accuracy of correcting the reconstructed video data.

In some embodiments, a manner in which the computer device obtains the M candidate pixel threshold pairs may include: determining a distortion cost caused by using a symmetric pixel threshold pair $P_k$ to correct the target reconstructed video frame in the target correction mode, where the symmetric pixel threshold pair $P_k$ belongs to P symmetric pixel threshold pairs, two candidate pixel thresholds in the symmetric pixel threshold pair of the P symmetric pixel threshold pairs have a symmetric relationship, P is a positive integer, and k is a positive integer less than or equal to P; selecting, if P distortion costs corresponding to the P symmetric pixel threshold pairs are obtained, an initial pixel threshold pair of the target reconstructed video frame in the target correction mode from the P symmetric pixel threshold pairs according to the P distortion costs; and adjusting the initial pixel threshold pair according to adjustment steps in an adjustment step set, to obtain the M candidate pixel threshold pairs.

The computer device may determine an optimal initial pixel threshold pair (for example, a symmetric pixel threshold pair), then adjust two candidate pixel thresholds in the initial pixel threshold pair according to the adjustment step set to obtain candidate pixel threshold pairs near the initial pixel threshold pair, and then determine a target pixel threshold pair (for example, an optimal pixel threshold pair) from the candidate pixel threshold pairs near the initial pixel threshold pair. For example, a calculation amount of determining the target pixel threshold pair can be reduced, and efficiency of determining the target pixel threshold pair may be improved. The computer device may obtain P symmetric pixel threshold pairs, and two candidate pixel thresholds included in a symmetric pixel threshold pair in the P symmetric pixel threshold pairs have a symmetric relationship. After one candidate pixel threshold included in the symmetric pixel threshold pair in the P symmetric pixel threshold pairs is determined, the other candidate pixel threshold is an opposite number of the determined candidate pixel threshold. P is a positive integer greater than 1. For example, P may be 2, 3, 4, or the like.

Further, the computer device may determine a distortion cost caused by using a symmetric pixel threshold pair $P_k$ to correct the target reconstructed video frame in the target correction mode, where the symmetric pixel threshold pair $P_k$ belongs to P symmetric pixel threshold pairs, and k is a positive integer less than or equal to P. The target reconstructed video frame is any frame in the reconstructed video data. The computer device may determine to correct, in the target correction mode, the target reconstructed video frame by using the symmetric pixel threshold pair $P_k$, to obtain a correction result of the target reconstructed video frame under the symmetric pixel threshold pair $P_k$. The correction result under the symmetric pixel threshold pair $P_k$ is a corrected target reconstructed video frame obtained by correcting the target reconstructed video frame by using the symmetric pixel threshold pair $P_k$. A distortion cost corresponding to the symmetric pixel threshold pair $P_k$ is obtained according to a pixel distortion rate between the correction result under the symmetric pixel threshold pair $P_k$ and the original video frame corresponding to the target reconstructed video frame, and the encoding bit rate of the symmetric pixel threshold pair $P_k$. Sequentially with reference to the manner of determining the distortion cost corresponding to the symmetric pixel threshold pair $P_k$, the distortion costs respectively corresponding to the symmetric pixel threshold pairs in the P symmetric pixel threshold pairs other than the symmetric pixel threshold pair $P_k$ are sequentially obtained until the P distortion costs corresponding to the P symmetric pixel threshold pairs are obtained.

Further, the computer device may select an initial pixel threshold pair of the target reconstructed video frame in the target correction mode from the P symmetric pixel threshold pairs according to the P distortion costs. The computer device may determine the symmetric pixel threshold pair with the smallest distortion cost as the initial pixel threshold pair of the target reconstructed video frame in the target correction mode; and adjust the initial pixel threshold pair according to adjustment steps in an adjustment step set, to obtain the M candidate pixel threshold pairs. After the initial pixel threshold pair (for example, the optimal symmetric threshold pair) is determined, two candidate pixel thresholds in the initial pixel threshold pair may be adjusted according to the adjustment steps in the adjustment step set, to obtain M candidate pixel threshold pairs. For example, the target pixel threshold pair is determined near the optimal symmetric threshold pair, so that a calculation amount of determining the target pixel threshold pair can be reduced, and efficiency of determining the target pixel threshold pair may be improved. The adjustment step set may include {−5, −4, −3, −2, −1, 0, 1, 2, 3, 4, 5, . . . }. The adjustment step set may also include other adjustment step sets, which is not limited in some embodiments.

In some embodiments, the M candidate pixel threshold pairs include a third candidate pixel threshold pair, and two candidate pixel thresholds in the third candidate pixel threshold pair have an asymmetric relationship. One candidate pixel threshold in the third candidate pixel threshold pair is obtained by adjusting a first initial pixel threshold in the initial pixel threshold pair according to a first adjustment step in the adjustment step set. The other candidate pixel threshold in the third candidate pixel threshold pair is obtained by adjusting a second initial pixel threshold in the initial pixel threshold pair according to a second adjustment step in the adjustment step set. For example, if one candidate pixel threshold in the initial pixel threshold pair is 10, and the other candidate pixel threshold is −10, summation processing may be performed on an absolute value of the candidate pixel threshold 10 and a step −2 in the adjustment step set, to obtain a candidate pixel threshold 8, and summation processing may be performed on an absolute value of the candidate pixel threshold −10 and a step −1 in the adjustment step set, to obtain a candidate pixel threshold 9, to obtain a candidate pixel threshold 8 and a candidate pixel threshold 9 in the third candidate pixel threshold pair.

In some embodiments, the M candidate pixel threshold pairs further include a fourth candidate pixel threshold pair, and two candidate pixel thresholds in the fourth candidate pixel threshold pair have a symmetric relationship. One candidate pixel threshold in the fourth candidate pixel threshold pair is obtained by adjusting the first initial pixel threshold according to a third adjustment step in the adjustment step set, and the other candidate pixel threshold in the fourth candidate pixel threshold pair is obtained by adjusting the second initial pixel threshold according to an opposite number of the third adjustment step. The computer device may obtain the opposite number of the third adjustment step, and obtain the other candidate pixel threshold in the fourth candidate pixel threshold pair by adjusting the second initial pixel threshold according to the opposite number of the third adjustment step. For example, if one candidate pixel threshold in the initial pixel threshold pair is 10, and the other candidate pixel threshold is −10, subtraction processing may be performed on the candidate pixel threshold 10 and a step 2 in the adjustment step set, to obtain a candidate pixel threshold 8, and subtraction processing may be performed on the candidate pixel threshold −10 and an opposite number −2 of a step 2 in the adjustment step set, to obtain a candidate pixel threshold −8, to obtain a candidate pixel threshold 8 and a candidate pixel threshold −8 in the fourth candidate pixel threshold pair.

S102: Determine distortion costs caused by correcting a target reconstructed video frame respectively according to the M candidate pixel threshold pairs in a target correction mode, to obtain M distortion costs.

The computer device may determine distortion costs caused by correcting a target reconstructed video frame respectively according to the M candidate pixel threshold pairs in a target correction mode, to obtain M distortion costs, where one candidate pixel threshold pair corresponds to one distortion cost. The target reconstructed video frame belongs to the reconstructed video data, and the target reconstructed video frame may refer to one video frame or a plurality of video frames of the reconstructed video frames. When the target reconstructed video frame refers to one video frame of the reconstructed video frames, the target reconstructed video frame may be a first frame, a key frame, or a randomly extracted frame of the reconstructed video data. The key frame refers to a frame in which key video content is located, a frame in which a key action is located, or the like. When the target reconstructed video frame includes a plurality of video frames, the plurality of video frames may be a plurality of video frames successively extracted or a plurality of video frames non-successively extracted from the reconstructed video data. The target correction mode may be a correction mode in which the reconstructed video data is corrected. Different correction modes determine different amounts of pixel correction for correcting the reconstructed video data. For example, the target correction mode may be any one of a horizontal correction mode (for example, a horizontal classification mode) under the edge offset policy, a vertical correction mode (for example, a vertical classification mode) under the edge offset policy, a diagonal correction mode (for example, a diagonal classification mode) under the edge offset policy, and an anti-diagonal correction mode (for example, an anti-diagonal classification mode) under the edge offset policy, and may be another correction mode. This is not limited in some embodiments. The edge offset policy refers to an EO compensation policy in Cross-Component Sample Adaptive Offset (CCSAO). The distortion cost may reflect a correction effect and an overhead of correcting the target reconstructed video frame by using the corresponding candidate pixel threshold pair. A smaller distortion cost may indicate a better corresponding correction effect and a smaller corresponding overhead. A larger distortion cost indicates a poorer corresponding correction effect and a larger corresponding overhead. For example, if the distortion cost caused by correcting the target reconstructed video frame by using the first candidate pixel threshold pair in the M candidate pixel threshold pairs is smaller, it indicates that the pixel distortion rate between the corrected target reconstructed video frame obtained by correcting the target reconstructed video frame by using the first candidate pixel threshold pair and the original video frame is smaller, and the transmission overhead of the first candidate pixel threshold pair is smaller.

In some embodiments, a manner in which the computer device obtains the M distortion costs may include: correcting, in the target correction mode, a reconstructed pixel value of the target reconstructed video frame respectively according to the M candidate pixel threshold pairs, to obtain M correction results, where the target reconstructed video frame belongs to the reconstructed video data; and determining, according to the M correction results, distortion costs caused by correcting the target reconstructed video frame respectively by using the M candidate pixel threshold pairs in the target correction mode, to obtain M distortion costs.

The computer device may correct, in the target correction mode, a reconstructed pixel value of the target reconstructed video frame respectively by using the M candidate pixel threshold pairs, to obtain M correction results, for example, correct, in the target correction mode, the reconstructed pixel value of the target reconstructed video frame by using the candidate pixel threshold pair $P_i$ of the M candidate pixel threshold pairs, to obtain a correction result under the candidate pixel threshold pair $P_i$, where the correction result under the candidate pixel threshold pair $P_i$ may refer to a corrected target reconstructed video frame obtained by correcting the target reconstructed video frame by using the candidate pixel threshold pair $P_i$; and the candidate pixel threshold pair $P_i$ belongs to the M candidate pixel threshold pairs, and i is a positive integer less than or equal to M, until M correction results corresponding to the M candidate pixel threshold pairs are obtained; and determine, according to the M correction results, distortion costs caused by correcting the target reconstructed video frame respectively by using the M candidate pixel threshold pairs in the target correction mode, to obtain M distortion costs.

In some embodiments, a manner in which the computer device obtains the M correction results may include: obtaining a target reconstructed pixel point in the target reconstructed video frame, and determining a reference pixel point of the target reconstructed pixel point in the target correction mode from the target reconstructed video frame; determining, according to the reference pixel point, the target reconstructed pixel point, and the M candidate pixel threshold pairs, correction categories respectively corresponding to the target reconstructed pixel point under the M candidate pixel threshold pairs, to obtain M correction categories; and correcting the reconstructed pixel value of the target reconstructed pixel point respectively according to the M correction categories, to obtain M correction results.

The computer device may obtain a target reconstructed pixel point in the target reconstructed video frame. The target reconstructed pixel point may refer to one or more pixel points in the target reconstructed video frame. When the target reconstructed pixel point may refer to any pixel point in the target reconstructed video frame, the target reconstructed pixel point may be a key pixel point or a randomly extracted pixel point in the target reconstructed video frame, and the key pixel point refers to a pixel point with a non-zero pixel value or adjacent pixel points all around. When the target reconstructed pixel point may refer to a plurality of pixel points in the target reconstructed video frame, the plurality of pixel points may be a plurality of pixel points successively extracted from the target reconstructed video frame. The computer device may determine a reference pixel point of the target reconstructed pixel point in the target correction mode from the target reconstructed video frame. In different correction modes in the edge offset policy, manners of determining the reference pixel point are different. In the horizontal correction mode of the edge offset policy, the reference pixel point may be a pixel point that is adjacent to the target reconstructed pixel point in a horizontal (for example, transverse) direction in the target reconstructed video frame and that has a smallest position distance from the target reconstructed pixel point. In the vertical correction mode of the edge offset policy, the reference pixel point may be a pixel point that is adjacent to the target reconstructed pixel point in a vertical (for example, longitudinal) direction in the target reconstructed video frame and that has a smallest position distance from the target reconstructed pixel point. In the diagonal correction mode of the edge offset policy, the reference pixel point is a pixel point in the target reconstructed video frame that is adjacent to the target reconstructed pixel point in a diagonal direction associated with the target reconstructed pixel point and that has a smallest position distance from the target reconstructed pixel point. A first angle between a line segment in the diagonal direction and a line segment in the horizontal direction is the same as a second angle between the line segment in the diagonal direction and a line segment in the vertical direction. In the anti-diagonal correction mode of the edge offset policy, the reference pixel point is a pixel point in the target reconstructed video frame that is adjacent to the target reconstructed pixel point in an anti-diagonal direction associated with the target reconstructed pixel point and that has a smallest position distance from the target reconstructed pixel point. A line segment in the anti-diagonal direction is perpendicular to the line segment in the diagonal direction.

Figure 6:
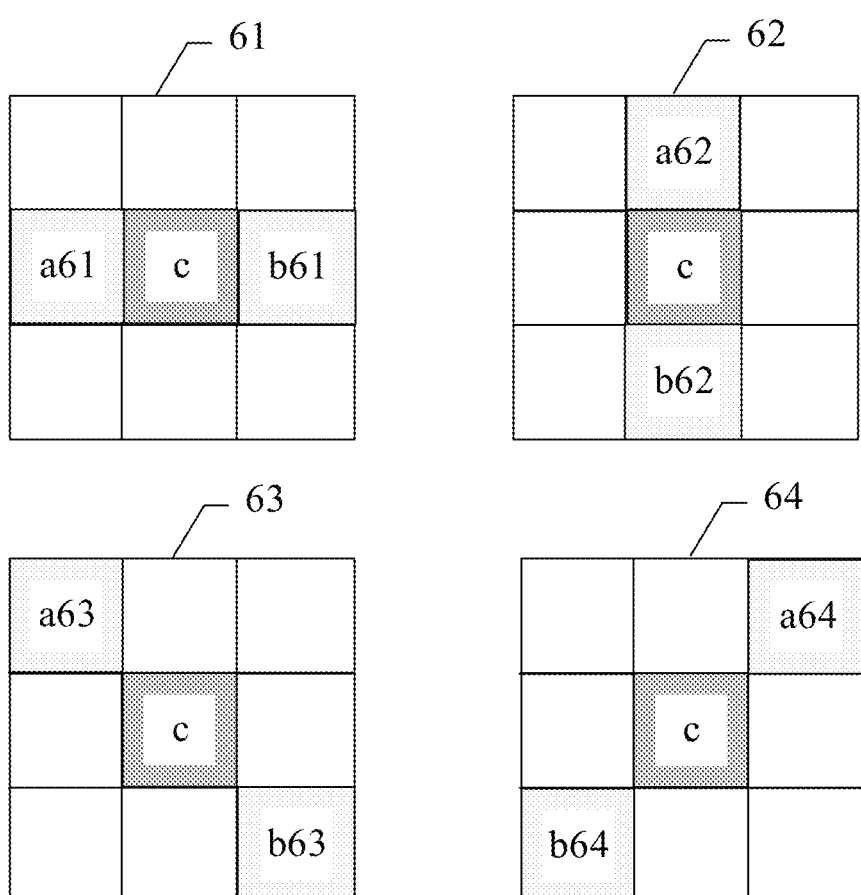
FIG. 6 is a schematic diagram of a reference pixel point according to some embodiments.

FIG. 6 is a schematic diagram of a reference pixel point according to some embodiments. FIG. 6 shows positions of reference pixel points respectively corresponding to a target reconstructed pixel point c in a horizontal correction mode 61, a vertical correction mode 62, a diagonal correction mode 63, and an anti-diagonal correction mode 64. As shown in FIG. 6, in the horizontal correction mode 61, reference pixel points of the target reconstructed pixel point c may be a pixel point a61 and a pixel point b61 that are adjacent to the target reconstructed pixel point in a horizontal (for example, transverse) direction and that have a smallest position distance from the target reconstructed pixel point. As shown in FIG. 6, in the vertical correction mode 62, reference pixel points of the target reconstructed pixel point c may be a pixel point a62 and a pixel point b62 that are adjacent to the target reconstructed pixel point in a vertical direction and that have a smallest position distance from the target reconstructed pixel point. As shown in FIG. 6, in the diagonal correction mode 63, reference pixel points of the target reconstructed pixel point c may be a pixel point a63 and a pixel point b63 that are adjacent to the target reconstructed pixel point in a diagonal direction and that have a smallest position distance from the target reconstructed pixel point. As shown in FIG. 6, in the anti-diagonal correction mode 64, reference pixel points of the target reconstructed pixel point c may be a pixel point a64 and a pixel point b64 that are adjacent to the target reconstructed pixel point in an anti-diagonal direction and that have a smallest position distance from the target reconstructed pixel point.

Further, the computer device may determine, according to the reference pixel point, the target reconstructed pixel point, and the M candidate pixel threshold pairs, correction categories respectively corresponding to the target reconstructed pixel point under the M candidate pixel threshold pairs, to obtain M correction categories; and correct the reconstructed pixel value of the target reconstructed pixel point respectively according to the M correction categories, to obtain M correction results. Different correction categories correspond to different pixel correction amounts. For example, a correction category of the target reconstructed pixel point is determined, and a reconstructed pixel value of the target reconstructed pixel point is corrected according to a pixel correction amount corresponding to the correction category. For example, a pixel correction amount of one correction category may be configured for correction within a range, so that a calculation amount can be reduced and correction efficiency may be improved.

In some embodiments, a manner in which the computer device determines the correction category may include: determining a pixel difference between the reconstructed pixel value of the target reconstructed pixel point and a reconstructed pixel value of the reference pixel point; comparing the pixel difference with the M candidate pixel threshold pairs respectively, to obtain comparison results respectively corresponding to the M candidate pixel threshold pairs; and determining, according to a comparison result corresponding to a candidate pixel threshold pair $P_i$, a correction category corresponding to the target reconstructed pixel point under the candidate pixel threshold pair $P_i$, where the candidate pixel threshold pair $P_i$ belongs to the M candidate pixel threshold pairs, and i is a positive integer less than or equal to M, until correction categories respectively corresponding to the target reconstructed pixel point under the M candidate pixel threshold pairs are obtained.

The computer device may obtain a pixel difference between the reconstructed pixel value of the target reconstructed pixel point and a reconstructed pixel value of the reference pixel point, and compare the pixel difference with the M candidate pixel threshold pairs respectively, to obtain comparison results respectively corresponding to the M candidate pixel threshold pairs. The computer device may obtain a magnitude relationship between the pixel difference and each candidate pixel threshold pair as a comparison result corresponding to a corresponding candidate pixel threshold pair. Further, the computer device may determine, according to a comparison result corresponding to a candidate pixel threshold pair $P_i$, a correction category corresponding to the target reconstructed pixel point under the candidate pixel threshold pair $P_i$, where the candidate pixel threshold pair $P_i$ belongs to the M candidate pixel threshold pairs, i is a positive integer less than or equal to M, and different comparison results correspond to different correction categories, until correction categories respectively corresponding to the target reconstructed pixel point under the M candidate pixel threshold pairs are obtained.

In some embodiments, the reference pixel point includes a first reference pixel point and a second reference pixel point. As shown in FIG. 6, in the horizontal correction mode 61, the reference pixel point may include a first reference pixel point a61 and a second reference pixel point b61. In the vertical correction mode 62, the reference pixel point may include a first reference pixel point a62 and a second reference pixel point b62. In the diagonal correction mode 63, the reference pixel point may include a first reference pixel point a63 and a second reference pixel point b63. In the anti-diagonal correction mode 64, the reference pixel point may include a first reference pixel point a64 and a second reference pixel point b64. The pixel difference includes a first pixel difference and a second pixel difference, the first pixel difference is a pixel difference between a reconstructed pixel value of the first reference pixel point and the reconstructed pixel value of the target reconstructed pixel point, and the second pixel difference is a pixel difference between a reconstructed pixel value of the second reference pixel point and the reconstructed pixel value of the target reconstructed pixel point. A manner in which the computer device obtains the comparison result may include: obtaining a quantity of correction categories in the target correction mode, and obtaining a first comparison result between the first pixel difference and the candidate pixel threshold pair $P_i$ according to the quantity of correction categories in the target correction mode; obtaining a second comparison result between the second pixel difference and the candidate pixel threshold pair $P_i$ according to the quantity of correction categories in the target correction mode; and using the first comparison result and the second comparison result as the comparison result corresponding to the candidate pixel threshold pair $P_i$, until the comparison results respectively corresponding to the M candidate pixel threshold pairs are obtained.

The computer device may obtain a quantity of correction categories in the target correction mode, for example, in the target correction mode, the to-be-corrected reconstructed pixel values may be divided into several categories, and different categories are corrected by using different pixel correction amounts. For example, the quantity of correction categories in the target correction mode may be 5, or the quantity of correction categories in the target correction mode may be 4, or the quantity of correction categories in the target correction mode may be 3. Further, the computer device may obtain a first comparison result between the first pixel difference and the candidate pixel threshold pair $P_i$ according to the quantity of correction categories in the target correction mode. The quantity of first comparison results matches the quantity of correction categories in the target correction mode, for example, the quantity of first comparison results is the same as the quantity of correction categories in the target correction mode. The computer device obtains a second comparison result between the second pixel difference and the candidate pixel threshold pair $P_i$ according to the quantity of correction categories in the target correction mode. Similarly, the quantity of second comparison results matches the quantity of correction categories in the target correction mode, for example, the quantity of second comparison results is the same as the quantity of correction categories in the target correction mode.

Further, the computer device may use the first comparison result and the second comparison result as the comparison result corresponding to the candidate pixel threshold pair $P_i$; and may obtain, with reference to the manner of obtaining the comparison result corresponding to the candidate pixel threshold pair $P_i$, the comparison results respectively corresponding to the candidate pixel threshold pairs in the M candidate pixel threshold pairs other than the candidate pixel threshold pair $P_i$, until the comparison results respectively corresponding to the M candidate pixel threshold pairs are obtained.

In some embodiments, a manner in which the computer device determines the correction category according to the comparison result may include: determining a first category indication value of the target reconstructed pixel point under the candidate pixel threshold pair $P_i$ according to the first comparison result; determining a second category indication value of the target reconstructed pixel point under the candidate pixel threshold pair $P_i$ according to the second comparison result; and determining a correction category of the target reconstructed pixel point under the candidate pixel threshold pair $P_i$ according to the first category indication value and the second category indication value.

The computer device may determine a first category indication value of the target reconstructed pixel point under the candidate pixel threshold pair $P_i$ according to the first comparison result, where the first category indication value is configured for reflecting a first correction category of the target reconstructed pixel point in the target correction mode; and determine a second category indication value of the target reconstructed pixel point under the candidate pixel threshold pair $P_i$ according to the second comparison result, where the second category indication value is configured for reflecting a second correction category of the target reconstructed pixel point in the target correction mode. Further, the computer device may determine a correction category of the target reconstructed pixel point under the candidate pixel threshold pair $P_i$ according to the first category indication value and the second category indication value. The computer device may weight the first category indication value and weight the second category indication value, and then determine the correction category of the target reconstructed pixel point under the candidate pixel threshold pair $P_i$ according to the weighted first category indication value, the weighted second category indication value, and correction categories of the target reconstructed pixel point in other correction modes. Since reconstructed pixel values respectively corresponding to the first reference pixel point and the second reference pixel point are different, correction categories obtained according to the first comparison result and the second comparison result are different. It can be seen that, the determining a correction category of the target reconstructed pixel point under the candidate pixel threshold pair $P_i$ according to the first category indication value and the second category indication value blends a plurality of factors, which can improve accuracy of determining the correction category.

In some embodiments, the candidate pixel threshold pair $P_i$ includes a first candidate pixel threshold and a second candidate pixel threshold, the first candidate pixel threshold is less than the second candidate pixel threshold, and the quantity of correction categories is four. The first candidate pixel threshold may be a negative threshold, and the second candidate pixel threshold may be a positive threshold. Using an example in which the quantity of correction categories in the target correction mode is four, a manner in which the computer device determines the first category indication value may include: determining a first value as the first category indication value of the target reconstructed pixel point under the candidate pixel threshold pair $P_i$ if the first comparison result indicates that the first pixel difference is a negative number and the first pixel difference is less than the first candidate pixel threshold; determining a second value as the first category indication value of the target reconstructed pixel point under the candidate pixel threshold pair $P_i$ if the first comparison result indicates that the first pixel difference is a negative number and the first pixel difference is greater than or equal to the first candidate pixel threshold; determining a third value as the first category indication value of the target reconstructed pixel point under the candidate pixel threshold pair $P_i$ if the first comparison result indicates that the first pixel difference is not a negative number and the first pixel difference is less than the second candidate pixel threshold; and determining a fourth value as the first category indication value of the target reconstructed pixel point under the candidate pixel threshold pair $P_i$ if the first comparison result indicates that the first pixel difference is a positive number and the first pixel difference is less than the second candidate pixel threshold. The first value, the second value, the third value, and the fourth value respectively correspond to four correction categories.

When the quantity of correction categories in the target correction mode is four, the computer device may detect whether the first pixel difference is less than zero (for example, detect whether the first pixel difference is a negative number). If the first comparison result indicates that the first pixel difference is a negative number, the first pixel difference is compared with the first candidate pixel threshold. A first value is determined as the first category indication value of the target reconstructed pixel point under the candidate pixel threshold pair $P_i$ if the first pixel difference is less than the first candidate pixel threshold. For example, the first value may be 0. A second value is determined as the first category indication value of the target reconstructed pixel point under the candidate pixel threshold pair $P_i$ if the first pixel difference is greater than or equal to the first candidate pixel threshold. The first value is different from the second value. For example, the second value may be 1. If the first comparison result indicates that the first pixel difference is not a negative number, the first pixel difference is compared with the second candidate pixel threshold. A third value is determined as the first category indication value of the target reconstructed pixel point under the candidate pixel threshold pair $P_i$ if the first pixel difference is less than the second candidate pixel threshold. The first value, the second value, and the third value are different from each other. For example, the third value may be 2. A fourth value is determined as the first category indication value of the target reconstructed pixel point under the candidate pixel threshold pair $P_i$ if the first pixel difference is greater than or equal to the second candidate pixel threshold. The first value, the second value, the third value, and the fourth value are different from each other. For example, the fourth value may be 3. The first value, the second value, the third value, and the fourth value respectively correspond to four correction categories. That is to say, the first value, the second value, the third value, and the fourth value respectively correspond to different correction categories of the four correction categories. For example, the first value corresponds to a correction category 11, the second value corresponds to a correction category 12, the third value corresponds to a correction category 13, and the fourth value corresponds to a correction category 14. Different correction categories correspond to different pixel correction amounts. For the manner of determining the second category indication value of the target reconstructed pixel point under the candidate pixel threshold pair $P_i$, reference may be made to the foregoing manner of determining the first category indication value. The computer device may determine the second category indication value from the first value, the second value, the third value, and the fourth value according to the second comparison result.

In some embodiments, When the quantity of correction categories in the target correction mode is four, the computer device may determine the correction category of the target reconstructed pixel point under the candidate pixel threshold pair $P_i$ according to the following Formula (2).

$$Ea = (a - c < 0)? \ (a - c < (Th_{Neg})? \ 0:1):(a - c < (Th_{Pos})? \ 2:3) \qquad (2)$$

$$Eb = (b - c < 0)? \ (b - c < (Th_{Neg})? \ 0:1):(b - c < (Th_{Pos})? \ 2:3)$$

$$class_{idx} = i_B * 16 + Ea + 4 + Eb$$

where in Formula (2), Ea refers to the first category indication value, Eb refers to the second category indication value, c refers to the reconstructed pixel value of the target reconstructed pixel point, a refers to the reconstructed pixel value of the first reference pixel point, and b refers to the reconstructed pixel value of the second reference pixel point; and Th_Neg refers to a negative threshold, (Th_Pos) refers to a positive threshold, 0 refers to a first value, 1 refers to a second value, 2 refers to a third value, 3 refers to a fourth value, $class_{idx}$ refers to a correction category, and $i_B$ refers to a target band category to which the reconstructed pixel value of the target reconstructed pixel point belongs in the CCSAO BO type. The computer device may determine whether (a−c<0). If (a−c<0), it is determined that a−c< (Th_Neg). If a−c<(Th_Neg), Ea=0. If a−c≥(Th_Neg), Ea=1. If (a−c≥0), it is determined that a−c<(Th_Pos). If a−c<(Th_Pos), Ea=2. If a−c≥(Th_Pos), Ea=3. For Eb, reference may be made to Ea.

For $i_B$, reference may be made to the following Formula (3).

$$i_B = (cur \cdot N_{cur}) \gg BD \ \text{(or)} \ i_B = \qquad (3)$$

$$(col1 \cdot N_{col1}) \gg BD \ \text{(or)} \ i_B = (col2 \cdot N_{col2}) \gg BD$$

where "cur" represents a reconstructed pixel value on a currently inputted to-be-processed color component (any one of a Y color component, a U color component, and a V color component) of the target reconstructed pixel point, and "col1" and "col2" respectively represent co-located reconstructed pixel values on the other two color components. If the currently inputted to-be-processed color component is the Y color component, the co-located reconstructed pixel values are a reconstructed pixel value on the U color component and a reconstructed pixel value on the V color component respectively. If the currently inputted to-be-processed color component is the U color component, the co-located reconstructed pixel values are a reconstructed pixel value on the Y color component and a reconstructed pixel value on the V color component respectively. If the currently inputted to-be-processed color component is the V color component, the co-located reconstructed pixel values are a reconstructed pixel value on the Y color component and a reconstructed pixel value on the U color component respectively. BD represents a pixel value bit depth, and i is a category index jointly generated by the three color components, and is a target band category of the currently inputted to-be-processed reconstructed pixel value. In some embodiments, ">" may be replaced with "≥", or "<" may be replaced with "≤".

In some embodiments, the candidate pixel threshold pair $P_i$ includes a first candidate pixel threshold and a second candidate pixel threshold, the first candidate pixel threshold is less than the second candidate pixel threshold, and the quantity of correction categories is three. The first candidate pixel threshold may be a negative threshold, and the second candidate pixel threshold may be a positive threshold. Using an example in which the quantity of correction categories in the target correction mode is three, a manner in which the computer device determines the first category indication value may include: determining a fifth value as the first category indication value of the target reconstructed pixel point under the candidate pixel threshold pair $P_i$ if the first comparison result indicates that the first pixel difference is less than the first candidate pixel threshold; determining a sixth value as the first category indication value of the target reconstructed pixel point under the candidate pixel threshold pair $P_i$ if the first comparison result indicates that the first pixel difference is greater than the second candidate pixel threshold; and determining a seventh value as the first category indication value of the target reconstructed pixel point under the candidate pixel threshold pair $P_i$ if the first comparison result indicates that the first pixel difference is equal to the first candidate pixel threshold or the first pixel difference is equal to the second candidate pixel threshold; or determining a seventh value as the first category indication value of the target reconstructed pixel point under the candidate pixel threshold pair $P_i$ if the first comparison result indicates that the first pixel difference is greater than the first candidate pixel threshold and the first pixel difference is less than the second candidate pixel threshold. The fifth value, the sixth value, and the seventh value respectively correspond to three correction categories.

The fifth value, the sixth value, and the seventh value are different from each other. For example, the fifth value may be 0, the sixth value may be 1, and the seventh value may be 3. The fifth value, the sixth value, and the seventh value respectively correspond to the three correction categories, for example, the fifth value, the sixth value, and the seventh value respectively correspond to different correction categories of the three correction categories. For example, the fifth value corresponds to a correction category 15, the sixth value corresponds to a correction category 16, and the seventh value corresponds to a correction category 17. Different correction categories correspond to different pixel correction amounts.

In some embodiments, When the quantity of correction categories in the target correction mode is three, the computer device may determine the correction category of the target reconstructed pixel point under the candidate pixel threshold pair $P_i$ according to the following Formula (4).

$$Ea = (a - c < \text{Th\_Neg}) \ ? \ 0:((a - c > \text{Th\_Pos}) \ ? \ 2:1) \qquad (4)$$

$$Eb = (b - c < \text{Th\_Neg}) \ ? \ 0:((b - c > \text{Th\_Pos}) \ ? \ 2:1)$$

$$class_{idx} = i_B * 9 + Ea + 3 + Eb$$

For parameters in the formula (4), reference may be made to the parameters in the foregoing formula (2). In some embodiments, ">" may be replaced with "≥", or "<" may be replaced with "≤".

In some embodiments, a manner in which the computer device obtains the M correction results may include: querying a correction value table for pixel correction amounts respectively corresponding to the M correction categories, to obtain M pixel correction amounts; and correcting the reconstructed pixel value of the target reconstructed pixel point respectively by using the M pixel correction amounts, to obtain M correction results.

The computer device may query a correction value table for pixel correction amounts respectively corresponding to the M correction categories, to obtain M pixel correction amounts. The correction value table includes correspondences between correction categories and pixel correction amounts, and one correction category corresponds to one pixel correction amount. The computer device may correct the reconstructed pixel value of the target reconstructed pixel point respectively by using the M pixel correction amounts, to obtain M correction results. The computer device may correct the reconstructed pixel value of the target reconstructed pixel point by using the pixel correction amount obtained based on the candidate pixel threshold pair $P_i$, to obtain the correction result under the candidate pixel threshold pair $P_i$ (for example, the corrected target reconstructed pixel point under the candidate pixel threshold pair $P_i$) until correction results respectively corresponding to the M candidate pixel threshold pairs are obtained, to obtain M correction results.

In some embodiments, a manner in which the computer device determines the M distortion costs according to the M correction results may include: determining a pixel distortion rate of the target reconstructed video frame under the candidate pixel threshold pair $P_i$ according to a corrected target reconstructed video frame included in a correction result $Q_i$ and an original video frame corresponding to the target reconstructed video frame, where the candidate pixel threshold pair $P_i$ belongs to the M candidate pixel threshold pairs, i is a positive integer less than or equal to M, the correction result $Q_i$ is a correction result obtained by using the candidate pixel threshold pair $P_i$ to correct the target reconstructed video frame, and the target reconstructed video frame is obtained by reconstructing encoded video data of the original video frame; and obtaining an encoding bit rate of the candidate pixel threshold pair $P_i$, and determining a distortion cost of the target reconstructed video frame under the candidate pixel threshold pair $P_i$ based on the pixel distortion rate of the target reconstructed video frame under the candidate pixel threshold pair $P_i$ and the encoding bit rate of the candidate pixel threshold pair $P_i$, until distortion costs respectively corresponding to the target reconstructed video frame under the M candidate pixel threshold pairs are obtained, to obtain M distortion costs.

The computer device may determine a pixel distortion rate of the target reconstructed video frame under the candidate pixel threshold pair $P_i$ according to a corrected target reconstructed video frame included in a correction result $Q_i$ and an original video frame corresponding to the target reconstructed video frame. The computer device may determine a difference between a reconstructed pixel value of a target reconstructed pixel point in the target reconstructed video frame and an original pixel value of an original pixel point corresponding to the target reconstructed pixel point in the original video frame as the pixel distortion rate of the target reconstructed video frame under the candidate pixel threshold pair $P_i$. In addition, because the encoding device may transmit the target pixel threshold pair to the decoding device, the computer device may obtain the encoding bit rate of the candidate pixel threshold pair $P_i$. Further, the computer device may determine a distortion cost of the target reconstructed video frame under the candidate pixel threshold pair $P_i$ based on the pixel distortion rate of the target reconstructed video frame under the candidate pixel threshold pair $P_i$ and the encoding bit rate of the candidate pixel threshold pair $P_i$, until distortion costs respectively corresponding to the target reconstructed video frame under the M candidate pixel threshold pairs are obtained, to obtain M distortion costs.

S103: Screen, according to the M distortion costs, a target pixel threshold pair of the reconstructed video data in the target correction mode from the M candidate pixel threshold pairs.

The computer device may screen, according to the M distortion costs, a target pixel threshold pair of the target reconstructed video frame in the target correction mode from the M candidate pixel threshold pairs, and determine the target pixel threshold pair of the target reconstructed video frame in the target correction mode as the target pixel threshold pair of the reconstructed video data in the target correction mode. An optimal candidate pixel threshold pair of the reconstructed video data in the target correction mode is screened through distortion costs of the M candidate pixel threshold pairs for some video frames (for example, the target reconstructed video frame) in the reconstructed video data. The distortion costs do may not be calculated for the full reconstructed video data, which may improve the efficiency of obtaining the optimal candidate pixel threshold pair and reducing the overhead of computing resources.

In some embodiments, the computer device may screen, according to the M distortion costs, a candidate pixel threshold pair with a smallest distortion cost from the M candidate pixel threshold pairs, and determine the screened candidate pixel threshold pair as the target pixel threshold pair of the reconstructed video data in the target correction mode. For example, the reconstructed video data is corrected using the target pixel threshold pair, so that the pixel distortion rate between the corrected reconstructed video data and the original video data is minimized, and the overhead caused by the correction is minimized, which may improve the accuracy of correcting the reconstructed video data.

S104: Correct reconstructed video frames in the reconstructed video data according to the target pixel threshold pair in the target correction mode, to obtain a target correction result of the reconstructed video data.

The computer device may correct reconstructed video frames in the reconstructed video data according to the target pixel threshold pair in the target correction mode, to obtain a target correction result of the reconstructed video data. For example, the reconstructed video data is corrected according to the target pixel threshold pair (for example, the optimal pixel threshold pair) in the target correction mode, so that accuracy of correcting the reconstructed video data may be improved.

In some embodiments, a quantity of target correction modes is N, and N is a positive integer. A manner in which the computer device obtains a target correction result of the reconstructed video data may include: correcting a reconstructed pixel value of a reconstructed video frame of the reconstructed video data according to a target pixel threshold pair in a target correction mode $Y_j$, to obtain a correction result of the reconstructed video frame of the reconstructed video data in the target correction mode $Y_j$, where j is a positive integer less than or equal to N, and the target correction mode $Y_j$ belongs to the N target correction modes; determining a distortion cost of the reconstructed video frame of the reconstructed video data in the target correction mode $Y_j$ according to the correction result of the reconstructed video frame of the reconstructed video data in the target correction mode $Y_j$; and determining, if N distortion costs corresponding to the reconstructed video frame of the reconstructed video data in the N target correction modes are obtained, a correction result corresponding to a smallest distortion cost in the N distortion costs as a target correction result of the reconstructed video frame of the reconstructed video data.

The N target correction modes may include a horizontal correction mode, a vertical correction mode, a diagonal correction mode, and an anti-diagonal correction mode. The computer device may obtain a target pixel threshold pair in each target correction mode, such as a target pixel threshold pair in the horizontal correction mode, a target pixel threshold pair in the vertical correction mode, a target pixel threshold pair in the diagonal correction mode, and a target pixel threshold pair in the anti-diagonal correction mode. Further, the computer device may correct a reconstructed pixel value of a reconstructed video frame of the reconstructed video data according to a target pixel threshold pair in a target correction mode $Y_j$, to obtain a correction result of the reconstructed video frame of the reconstructed video data in the target correction mode $Y_j$, where the target correction mode $Y_j$ belongs to the N target correction modes. For additional implementation details, reference may be made to the descriptions of determining the correction result.

Further, the computer device may determine a distortion cost of the reconstructed video frame of the reconstructed video data in the target correction mode $Y_j$ according to the correction result of the reconstructed video frame of the reconstructed video data in the target correction mode $Y_j$. For additional implementation details, reference may be made to the descriptions of determining the distortion cost. If N distortion costs corresponding to the reconstructed video frame of the reconstructed video data in the N target correction modes are obtained, a correction result corresponding to a smallest distortion cost in the N distortion costs is determined as a target correction result of the reconstructed video frame of the reconstructed video data. For example, an optimal correction mode is determined from a plurality of target correction modes (such as the horizontal correction mode, the vertical correction mode, the diagonal correction mode, and the anti-diagonal correction mode), and a correction result corresponding to the optimal correction mode is used as the target correction result of the reconstructed video frame of the reconstructed video data. For example, accuracy of correcting the reconstructed video data may be improved.

In some embodiments, the computer device may further transmit a first pixel threshold and a second pixel threshold of the target pixel threshold pair in the target correction mode to a decoding device, where the decoding device is configured to determine the target correction result of the reconstructed video data according to the first pixel threshold and the second pixel threshold of the target pixel threshold pair in the target correction mode. The encoding device may transmit respectively corresponding target pixel threshold pairs in the N target correction modes to the decoding device, for example, transmit the target pixel threshold pair in the horizontal correction mode, the target pixel threshold pair in the vertical correction mode, the target pixel threshold pair in the diagonal correction mode, and the target pixel threshold pair in the anti-diagonal correction mode to the decoding device. In addition, the encoding device may transmit an optimal correction mode corresponding to each reconstructed pixel point in the reconstructed video data to the decoding device, where the optimal correction mode refers to a target correction mode with a smallest distortion cost.

The computer device may obtain respectively corresponding distortion costs of each reconstructed pixel point in the reconstructed video data in the N target correction modes, to obtain N distortion costs, and determine a target correction mode corresponding to a smallest distortion cost among the N distortion costs as the optimal correction mode corresponding to the reconstructed pixel point. The decoding device may obtain the encoded video data related to the original video data and transmitted by the encoding device, and reconstruct the encoded video data to obtain to-be-corrected reconstructed video data. After obtaining the respectively corresponding target pixel threshold pairs in the N target correction modes, the decoding device may obtain an optimal correction mode corresponding to each reconstructed pixel point in the reconstructed video data, and determine a target pixel threshold pair corresponding to the optimal correction mode from the respectively corresponding target pixel threshold pairs in the N target correction modes. The computer device may correct the corresponding reconstructed pixel point by using the target pixel threshold pair corresponding to the optimal correction mode, to obtain a corrected reconstructed pixel point. For example, accuracy of correcting the reconstructed video data may be improved.

In some embodiments, a manner in which the computer device transmits the target pixel threshold pair in the target correction mode to the decoding device may include: obtaining a first threshold index of a first absolute value of the first pixel threshold in a first candidate pixel threshold interval and a second threshold index of a second absolute value of the second pixel threshold in a second candidate pixel threshold interval; and transmitting the first threshold index corresponding to the first pixel threshold and the second threshold index corresponding to the second pixel threshold to the decoding device.

The computer device may directly transmit the threshold indexes respectively corresponding to the first pixel threshold and the second pixel threshold in the target pixel threshold pair in the target correction mode to the decoding device. The computer device may obtain a first absolute value of the first pixel threshold, obtain a first candidate pixel threshold interval to which the first pixel threshold belongs, and determine a first threshold index of the first absolute value in the first candidate pixel threshold interval. The first threshold index is configured for indicating a position of the first pixel threshold in the first candidate pixel threshold interval. The decoding device may obtain the first pixel threshold from the first candidate pixel threshold interval according to the first threshold index. Similarly, the computer device may obtain a second absolute value of the second pixel threshold, obtain a second candidate pixel threshold interval to which the second pixel threshold belongs, and determine a second threshold index of the second absolute value in the second candidate pixel threshold interval. The second threshold index is configured for indicating a position of the second pixel threshold in the second candidate pixel threshold interval. The decoding device may obtain the second pixel threshold from the second candidate pixel threshold interval according to the second threshold index. For example, because there are positive and negative signs for the first pixel threshold and the second pixel threshold, and the first threshold index and the second threshold index are directly transmitted without transmitting the positive and negative signs, transmission overhead of the target pixel threshold pair can be reduced.

In some embodiments, a manner in which the computer device transmits the target pixel threshold pair in the target correction mode to the decoding device may include: obtaining a first threshold index of a first absolute value of the first pixel threshold in a first candidate pixel threshold interval and a second threshold index of a second absolute value of the second pixel threshold in a second candidate pixel threshold interval; and obtaining an index difference between the first threshold index and the second threshold index; and transmitting the first threshold index and the index difference to the decoding device, or transmitting the second threshold index and the index difference to the decoding device.

The computer device may obtain a first absolute value of the first pixel threshold, obtain a first candidate pixel threshold interval to which the first pixel threshold belongs, and determine a first threshold index of the first absolute value in the first candidate pixel threshold interval. Similarly, the computer device may obtain a second absolute value of the second pixel threshold, obtain a second candidate pixel threshold interval to which the second pixel threshold belongs, and determine a second threshold index of the second absolute value in the second candidate pixel threshold interval. Further, the computer device may obtain an index difference between the first threshold index and the second threshold index; and transmit the first threshold index and the index difference to the decoding device, or transmit the second threshold index and the index difference to the decoding device. When the index difference is not 0, the computer device may obtain an index difference sign of the index difference and transmit the index difference sign to the decoding device. The index difference sign is configured for indicating whether the index difference is a positive number or a negative number. When the index difference sign is 1, it indicates that the index difference is a negative number. When the index difference sign is 0, it indicates that the index difference is a positive number. When the index difference is not 0, an index difference sign may not be transmitted. For example, relative to direct transmission of the first pixel threshold and the second pixel threshold with positive and negative signs, transmission overhead can be reduced.

In some embodiments, the computer device may transmit the first threshold index (for example, the threshold index of the negative pixel threshold) and the index difference to the decoding device. After obtaining the first threshold index, the decoding device determines the first pixel threshold according to the first threshold index, and detects whether the index difference sign is 0. If the index difference sign is 0, it is determined that the first pixel threshold is equal to the second pixel threshold. If the index difference sign is not 0, the index difference is determined according to the absolute value of the index difference and the index difference sign, and summation processing is performed on the index difference and the first pixel threshold to obtain the second pixel threshold.

In some embodiments, the computer device may transmit the second threshold index (for example, the threshold index of the positive pixel threshold) and the index difference to the decoding device. After obtaining the second threshold index, the decoding device determines the second pixel threshold according to the second threshold index, and detects whether the index difference sign is 0. If the index difference sign is 0, it is determined that the second pixel threshold is equal to the first pixel threshold. If the index difference sign is not 0, the index difference is determined according to the absolute value of the index difference and the index difference sign, and summation processing is performed on the index difference and the second pixel threshold to obtain the first pixel threshold.

In some embodiments, a manner in which the computer device transmits the target pixel threshold pair in the target correction mode to the decoding device may include: generating a first indication identifier corresponding to a first absolute value of the first pixel threshold, where the first indication identifier is configured for indicating that the first absolute value is an absolute value of the first pixel threshold; generating a second indication identifier corresponding to a second absolute value of the second pixel threshold, where the second indication identifier is configured for indicating that the second absolute value is an absolute value of the second pixel threshold; and transmitting the first absolute value, the first indication identifier, the second absolute value, and the second indication identifier to the decoding device.

The computer device may generate a first indication identifier corresponding to a first absolute value of the first pixel threshold, where the first indication identifier may be, for example, th_Neg, and generate a second indication identifier corresponding to a second absolute value of the second pixel threshold, where the second indication identifier may be Th_Pos. The computer device may directly transmit "Th_Neg=the first absolute value, and Th_Pos=the second absolute value" to the decoding device.

In some embodiments, a manner in which the computer device transmits the target pixel threshold pair in the target correction mode to the decoding device may include: generating a first indication identifier of a first absolute value corresponding to the first pixel threshold, where the first indication identifier is configured for indicating that the first absolute value is an absolute value of the first pixel threshold; generating a second indication identifier of a second absolute value corresponding to the second pixel threshold, where the second indication identifier is configured for indicating that the second absolute value is an absolute value of the second pixel threshold; obtaining a target difference between the first absolute value and the second absolute value; and transmitting the first absolute value, the first indication identifier, and the target difference to the decoding device, or transmitting the second absolute value, the second indication identifier, and the target difference to the decoding device.

The computer device may generate a first indication identifier of a first absolute value corresponding to the first pixel threshold, and generate a second indication identifier of a second absolute value corresponding to the second pixel threshold; obtain a target difference between the first absolute value and the second absolute value; and transmit the first absolute value, the first indication identifier, and the target difference to the decoding device, or transmit the second absolute value, the second indication identifier, and the target difference to the decoding device. The computer device may obtain a difference sign bit corresponding to the target difference, where the difference sign bit is configured for indicating whether the target difference is a positive number or a negative number. If the target difference is not 0, the difference sign bit of the target difference is transmitted (for example, if the target difference is less than 0, the difference sign bit is 1; or if the target difference is greater than 0, the difference sign bit is 0). The decoding device may obtain the first pixel threshold and the second pixel threshold (for example, the positive threshold and the negative threshold) by parsing the absolute value of the threshold (for example, the first absolute value or the second absolute value), the absolute value of the target difference, and the corresponding difference sign bit.

In some embodiments, the computer device may transmit the first absolute value, the first indication identifier, and the target difference to the decoding device. For example, the decoding device may determine the first pixel threshold according to the first absolute value and the first indication identifier, and determine the second pixel value according to the target difference and the first pixel value. In some embodiments, the computer device may transmit the second absolute value, the second indication identifier, and the target difference to the decoding device. For example, the decoding device may determine the second pixel threshold according to the second absolute value and the second indication identifier, and determine the first pixel value according to the target difference and the second pixel value.

Whether to correct the reconstructed video data by using a target pixel threshold pair in a target correction mode determined from the M candidate pixel threshold pairs in the encoding device may be transmitted in a high-layer syntactic element. The high-layer syntactic element may be a Sequence Parameter Set (SPS, which stores an encoding parameter for a video sequence), a Picture Parameter Set (PPS, which provides, similar to an SPS, a parameter for decoding in an encoded bit stream), PictureHeader (for example, a video header, including a parameter for decoding), or SliceHeader (for example, an encoded slice, including a parameter for decoding).

In some embodiments, there is an asymmetric relationship between two candidate pixel thresholds of at least one candidate pixel threshold pair in the M candidate pixel threshold pairs for screening, for example, all candidate pixel threshold pairs in the M candidate pixel threshold pairs are asymmetric candidate pixel threshold pairs, or the M candidate pixel threshold pairs, one part of the candidate pixel threshold pairs are symmetric candidate pixel threshold pairs and the other part of the candidate pixel threshold pairs are asymmetric candidate pixel threshold pairs, which expands a range for screening and facilitates screening of an optimal candidate pixel threshold pair. In a process of screening an optimal candidate pixel threshold pair, an optimal candidate pixel threshold pair (for example, a target pixel threshold pair) of the reconstructed video data in the target correction mode is screened from the M candidate pixel threshold pairs by using distortion costs (for example, correction effects) respectively corresponding to the M candidate pixel threshold pairs, which may improve accuracy of screening the candidate pixel threshold pair. The distortion cost corresponding to the candidate pixel threshold pair herein refers to a distortion cost caused by correcting the target reconstructed video frame according to the candidate pixel threshold pair in the target correction mode. Further, the reconstructed video frame in the reconstructed video data is corrected according to the optimal candidate pixel threshold pair in the target correction mode, to obtain the target correction result of the reconstructed video data, which may improve the correction accuracy of the reconstructed video data. The target correction result of the reconstructed video data may be used as reference data in an encoding process of a subsequent video frame. Therefore, the encoding performance of the subsequent video frame may be improved through the target correction result of the reconstructed video data. In addition, some embodiments may reduce transmission overhead of transmitting the target pixel threshold pair in the target correction mode to the decoding device.

Figure 7:
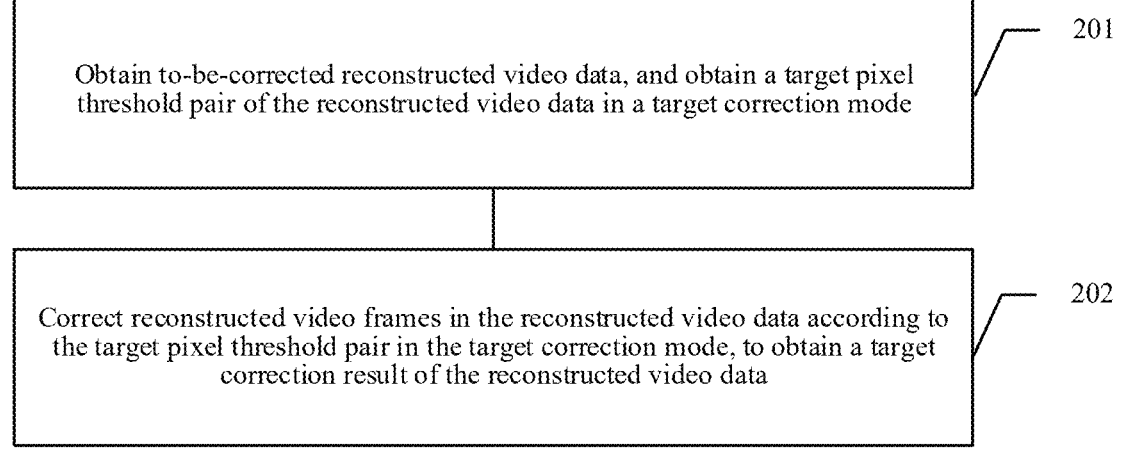
FIG. 7 is a schematic diagram of a video data processing method according to some embodiments.

FIG. 7 is a schematic flowchart of a video data processing method according to some embodiments. The method may be performed by a computer device, and the computer device may be a decoding device. As shown in FIG. 7, the method may include, but is not limited to, the following operations:

S201: Obtain to-be-corrected reconstructed video data, and obtain a target pixel threshold pair of the reconstructed video data in a target correction mode.

After obtaining the corresponding encoded video data related to the original video data and transmitted by the encoding device, the computer device may perform operations of inverse quantization, inverse transform, and predictive compensation on the encoded video data corresponding to the original video data, to obtain to-be-corrected reconstructed video data. The encoded video data may be obtained by encoding original video data corresponding to the reconstructed video data. In the process of encoding the original video data, operations such as encoding, transform, and quantization are performed on the original video data. Therefore, for the reconstructed video data, compared with the original video data, partial information of the reconstructed video data is different from partial information of the original video data, resulting in distortion of the reconstructed video data. Therefore, the computer device may correct the reconstructed video data to reduce a distortion degree of the reconstructed video data. The computer device may obtain a target pixel threshold pair of the reconstructed video data in a target correction mode. The target pixel threshold pair in the target correction mode may be transmitted by the encoding device. A quantity of target correction modes may be N, and N is a positive integer. For example, the N target correction modes may include a horizontal correction mode, a vertical correction mode, a diagonal correction mode, and an anti-diagonal correction mode of an edge offset policy (for example, EO classification) in CCSAO, and may also include other correction modes.

The target pixel threshold pair in the target correction mode is obtained by screening M candidate pixel threshold pairs according to M distortion costs, the M distortion costs include distortion costs caused by correcting a target reconstructed video frame respectively according to the M candidate pixel threshold pairs in the target correction mode, the target reconstructed video frame belongs to the reconstructed video data, and two candidate pixel thresholds of at least one of the M candidate pixel threshold pairs have an asymmetric relationship. A candidate pixel threshold pair including two candidate pixel thresholds respectively corresponding to different absolute values may exist in the M candidate pixel threshold pairs. M is a positive integer greater than 1, for example, M may be 2, 3, 4, or the like.

In some embodiments, the target pixel threshold pair of the reconstructed video data in the target correction mode is transmitted by the encoding device.

In some embodiments, the M candidate pixel threshold pairs include a first candidate pixel threshold pair, and two candidate pixel thresholds in the first candidate pixel threshold pair have an asymmetric relationship. The two candidate pixel thresholds in the first candidate pixel threshold pair may respectively correspond to different absolute values. For example, the two candidate pixel thresholds in the first candidate pixel threshold pair are a candidate pixel threshold e1 and a candidate pixel threshold e2. The candidate pixel threshold e1 is 1, and the candidate pixel threshold e2 is −2. "1" is asymmetric with "−2", for example, an absolute value "1" of the candidate pixel threshold e1 and an absolute value "2" of the candidate pixel threshold e2 are different. For example, determining any one candidate pixel threshold of any candidate pixel threshold pair is not affected by the other candidate pixel threshold, so that flexibility in determining the candidate pixel threshold of the candidate pixel threshold pair may be improved.

In some embodiments, the two candidate pixel thresholds in the first candidate pixel threshold pair are generated according to different candidate pixel thresholds in a same candidate pixel threshold interval; or the two candidate pixel thresholds in the first candidate pixel threshold pair are generated according to candidate pixel thresholds in different candidate pixel threshold intervals, and the candidate pixel thresholds in the different candidate pixel threshold intervals are different. Absolute values of the two candidate pixel thresholds in the first candidate pixel threshold pair may be obtained by selecting different pixel thresholds within the same candidate pixel threshold interval. For example, the candidate pixel threshold e1 in the first candidate pixel threshold pair may be a threshold s11 selected from a candidate pixel threshold interval s1, the candidate pixel threshold e2 in the first candidate pixel threshold pair may be a threshold s12 selected from the candidate pixel threshold interval s1, and the threshold s11 is different from the threshold s12. Absolute values of the two candidate pixel thresholds in the first candidate pixel threshold pair may be obtained through selection from different candidate pixel threshold intervals. Because pixel thresholds in different candidate pixel threshold intervals are different, two selected candidate pixel thresholds are different. For example, the candidate pixel threshold e1 in the first candidate pixel threshold pair may be a threshold s13 selected from a candidate pixel threshold interval s1, and the candidate pixel threshold e2 in the first candidate pixel threshold pair may be a threshold s21 selected from a candidate pixel threshold interval s2. In some embodiments, a candidate pixel threshold interval may include {2, 4, 6, 8, 10, 14, 18, 22, 30, 38, 54, 70, 86, 118, 150, 182}, and a candidate pixel interval may include {1, 3, 5, 7, 9, 11, 13, 15, 17, 19, 25}. Other candidate pixel intervals may also be included.

In some embodiments, the M candidate pixel threshold pairs further include a second candidate pixel threshold pair, and two candidate pixel thresholds in the second candidate pixel threshold pair have a symmetric relationship. Absolute values respectively corresponding to the two candidate pixel thresholds in the second candidate pixel threshold pair may be the same. For example, the two candidate pixel thresholds in the second candidate pixel threshold pair are a candidate pixel threshold r1 and a candidate pixel threshold r2. The candidate pixel threshold r1 is 1, and the candidate pixel threshold r2 is −1. "1" is symmetric with "−1", for example, an absolute value "1" of the candidate pixel threshold r1 and an absolute value "1" of the candidate pixel threshold r2 are the same.

In some embodiments, the two candidate pixel thresholds in the second candidate pixel threshold pair are generated according to a same candidate pixel threshold in a same candidate pixel threshold interval. For example, absolute values of the two candidate pixel thresholds in the second candidate pixel threshold pair may be obtained by selecting the same value within the same candidate pixel threshold interval. For example, the candidate pixel threshold r1 in the second candidate pixel threshold pair may be a threshold s31 selected from a candidate pixel threshold interval s3, and the candidate pixel threshold r2 in the second candidate pixel threshold pair may also be a threshold s31 selected from the candidate pixel threshold interval s3.

It can be learned that the two candidate pixel thresholds included in the candidate pixel threshold pair in the M candidate pixel threshold pairs may or may not have a symmetric relationship. The M candidate pixel threshold pairs may be obtained by randomly combining values in one or more candidate pixel threshold intervals. It can be seen that the M candidate pixel threshold pairs cover a wide range, so that an accurate target pixel threshold pair (for example, an optimal pixel threshold pair) can be determined subsequently, which may improve accuracy of correcting the reconstructed video data.

In some embodiments, the M candidate pixel threshold pairs are obtained by adjusting an initial pixel threshold pair based on adjustment steps in an adjustment step set. The initial pixel threshold pair is selected from P symmetric pixel threshold pairs based on P distortion costs corresponding to the P symmetric pixel threshold pairs; and one symmetric pixel threshold pair corresponds to one distortion cost, two candidate pixel thresholds included in one symmetric pixel threshold pair of the P symmetric pixel threshold pairs have a symmetric relationship, and P is a positive integer greater than 1. A distortion cost corresponding to a symmetric pixel threshold pair $P_k$ is a distortion cost caused by using the symmetric pixel threshold pair $P_k$ to correct the target reconstructed video frame; and the symmetric pixel threshold pair $P_k$ belongs to the P symmetric pixel threshold pairs, and k is a positive integer less than or equal to P. Two candidate pixel thresholds in the initial pixel threshold pair are adjusted according to the adjustment step set to obtain candidate pixel threshold pairs near the initial pixel threshold pair, and then a target pixel threshold pair (for example, an optimal pixel threshold pair) is determined from the M candidate pixel threshold pairs near the initial pixel threshold pair. For example, a calculation amount of determining the target pixel threshold pair can be reduced, and efficiency of determining the target pixel threshold pair may be improved. The adjustment step set may include {−5, −4, −3, −2, −1, 0, 1, 2, 3, 4, 5, . . . }. The adjustment step set may also include other adjustment step sets.

In some embodiments, the M candidate pixel threshold pairs include a third candidate pixel threshold pair, and two candidate pixel thresholds in the third candidate pixel threshold pair have an asymmetric relationship. One candidate pixel threshold in the third candidate pixel threshold pair is obtained by adjusting a first initial pixel threshold in the initial pixel threshold pair according to a first adjustment step in the adjustment step set. The other candidate pixel threshold in the third candidate pixel threshold pair is obtained by adjusting a second initial pixel threshold in the initial pixel threshold pair according to a second adjustment step in the adjustment step set. For example, if one candidate pixel threshold in the initial pixel threshold pair is 10, and the other candidate pixel threshold is −10, summation processing may be performed on an absolute value of the candidate pixel threshold 10 and a step −2 in the adjustment step set, to obtain a candidate pixel threshold 8, and summation processing may be performed on an absolute value of the candidate pixel threshold −10 and a step −1 in the adjustment step set, to obtain a candidate pixel threshold 9, to obtain a candidate pixel threshold 8 and a candidate pixel threshold 9 in the third candidate pixel threshold pair.

In some embodiments, the M candidate pixel threshold pairs further include a fourth candidate pixel threshold pair, and two candidate pixel thresholds in the fourth candidate pixel threshold pair have a symmetric relationship. One candidate pixel threshold in the fourth candidate pixel threshold pair is obtained by adjusting the first initial pixel threshold according to a third adjustment step in the adjustment step set, and the other candidate pixel threshold in the fourth candidate pixel threshold pair is obtained by adjusting the second initial pixel threshold according to an opposite number of the third adjustment step. The computer device may obtain the opposite number of the third adjustment step, and obtain the other candidate pixel threshold in the fourth candidate pixel threshold pair by adjusting the second initial pixel threshold according to the opposite number of the third adjustment step. For example, if one candidate pixel threshold in the initial pixel threshold pair is 10, and the other candidate pixel threshold is −10, subtraction processing may be performed on the candidate pixel threshold 10 and a step 2 in the adjustment step set, to obtain a candidate pixel threshold 8, and subtraction processing may be performed on the candidate pixel threshold −10 and an opposite number −2 of a step 2 in the adjustment step set, to obtain a candidate pixel threshold −8, to obtain a candidate pixel threshold 8 and a candidate pixel threshold −8 in the fourth candidate pixel threshold pair.

S202: Correct reconstructed video frames in the reconstructed video data according to the target pixel threshold pair in the target correction mode, to obtain a target correction result of the reconstructed video data.

A quantity of target correction modes may be N, and the computer device may obtain target pixel threshold pairs respectively corresponding to the N target correction modes. The encoding device may transmit an optimal correction mode corresponding to each pixel point to the decoding device. The computer device may obtain an optimal correction mode corresponding to each reconstructed pixel point in the reconstructed video data, and determine a target pixel threshold pair corresponding to the optimal correction mode from the respectively corresponding target pixel threshold pairs in the N target correction modes. The computer device may correct a reconstructed pixel value of a reconstructed pixel point by using the target pixel threshold pair corresponding to the optimal correction mode, to obtain a correction result (for example, a corrected reconstructed pixel point) corresponding to the corresponding reconstructed pixel point, until a correction result corresponding to each reconstructed pixel point in the reconstructed video data is obtained, to obtain the target correction result of the reconstructed video data. The computer device may obtain an optimal correction mode corresponding to a reconstructed pixel point $W_t$ in the reconstructed video data, and determine a target pixel threshold pair $H_t$ corresponding to the optimal correction mode corresponding to the reconstructed pixel point $W_t$ from the respectively corresponding target pixel threshold pairs in the N target correction modes; and correct a reconstructed pixel value of the reconstructed pixel point $W_t$ by using the target pixel threshold pair $H_t$ corresponding to the optimal correction mode, to obtain a correction result corresponding to the reconstructed pixel point $W_t$ (for example, a corrected reconstructed pixel point $W_t$). until correction results corresponding to all reconstructed pixel points in the reconstructed video data are obtained, where the correction results corresponding to all the reconstructed pixel points in the reconstructed video data are used as the target correction result of the reconstructed video data. For example, the target pixel threshold pair in the target correction mode is determined based on the M candidate pixel threshold pairs, and has high accuracy. Therefore, the reconstructed video data is corrected according to the target pixel threshold pair with high accuracy, so that accuracy of correcting the reconstructed video data may be improved.

In some embodiments, to-be-corrected reconstructed video data is obtained, and a target pixel threshold pair of the reconstructed video data in a target correction mode is obtained; and reconstructed video frames in the reconstructed video data are corrected according to the target pixel threshold pair in the target correction mode, to obtain a target correction result of the reconstructed video data. The target pixel threshold pair in the target correction mode is screened from M candidate pixel threshold pairs according to M distortion costs, there is an asymmetric relationship between two candidate pixel thresholds of at least one candidate pixel threshold pair in the M candidate pixel threshold pairs for screening, for example, all candidate pixel threshold pairs in the M candidate pixel threshold pairs are asymmetric candidate pixel threshold pairs, or the M candidate pixel threshold pairs, one part of the candidate pixel threshold pairs are symmetric candidate pixel threshold pairs and the other part of the candidate pixel threshold pairs are asymmetric candidate pixel threshold pairs, which expands a range for screening and facilitates screening of an optimal candidate pixel threshold pair. In a process of screening an optimal candidate pixel threshold pair, an optimal candidate pixel threshold pair (for example, a target pixel threshold pair) of the reconstructed video data in the target correction mode is screened from the M candidate pixel threshold pairs by using distortion costs (for example, correction effects) respectively corresponding to the M candidate pixel threshold pairs, which may improve accuracy of screening the candidate pixel threshold pair. The distortion cost corresponding to the candidate pixel threshold pair herein refers to a distortion cost caused by correcting the target reconstructed video frame according to the candidate pixel threshold pair in the target correction mode. Further, the reconstructed video frame in the reconstructed video data is corrected according to the optimal candidate pixel threshold pair in the target correction mode, to obtain the target correction result of the reconstructed video data, which may improve the correction accuracy of the reconstructed video data. The target correction result of the reconstructed video data is used as decoded video data of the encoded video data, and may also be used as reference data in a decoding process of subsequent encoded video data, which may improve decoding performance of the subsequent encoded video data.

Figure 8:
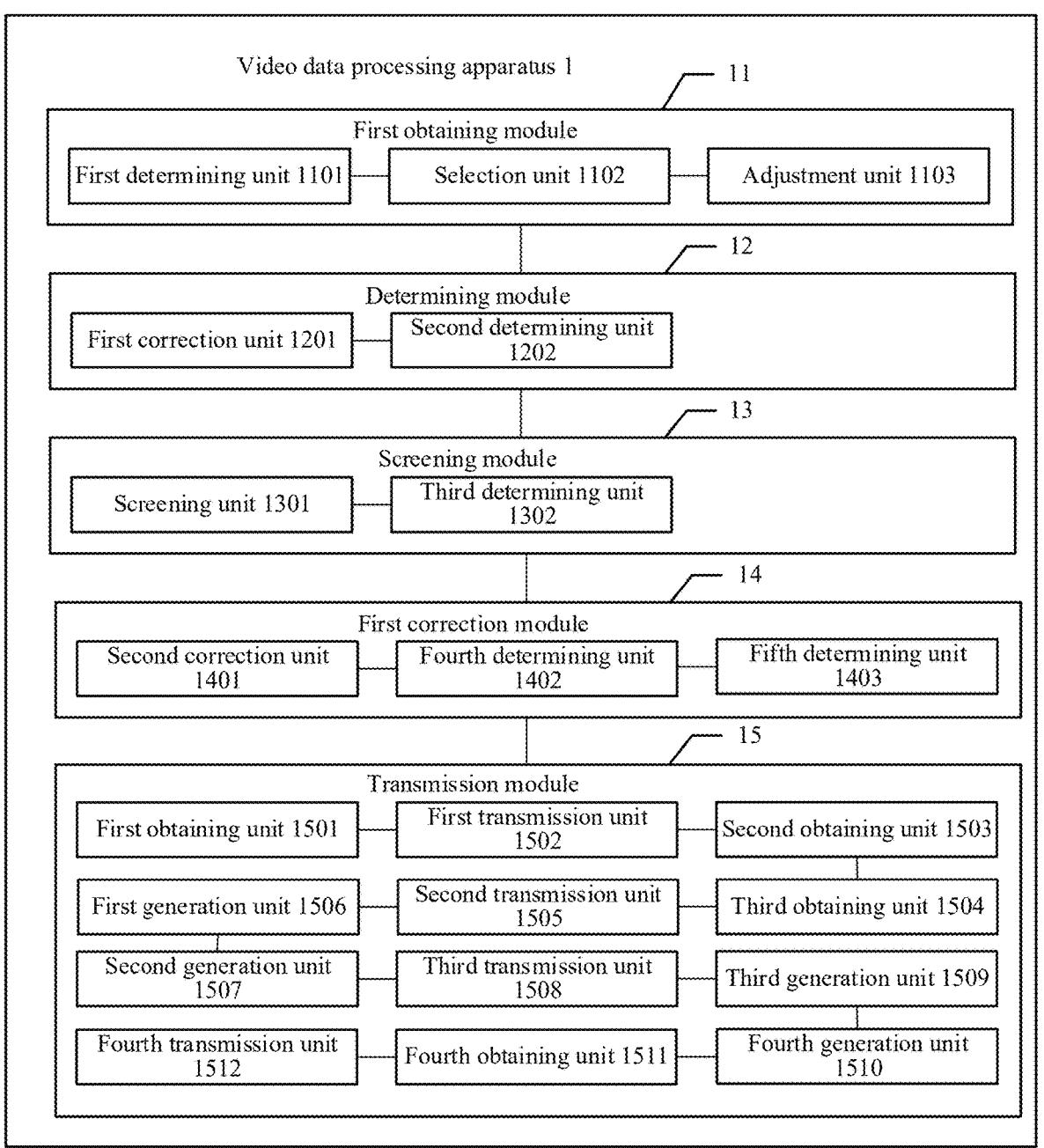
FIG. 8 is a schematic structural diagram of a video data processing apparatus according to some embodiments.

FIG. 8 is a schematic structural diagram of a video data processing apparatus 1 according to some embodiments. The foregoing video data processing apparatus 1 may be a computer program (including program code) running in a computer device. For example, the video data processing apparatus 1 is application software. The video data processing apparatus 1 may be configured to perform corresponding operations in the video data processing method provided in some embodiments. As shown in FIG. 8, the video data processing apparatus 1 may include: a first obtaining module 11, a determining module 12, a screening module 13, a first correction module 14, and a transmission module 15.

The first obtaining module 11 is configured to obtain to-be-corrected reconstructed video data, and obtain M candidate pixel threshold pairs, two candidate pixel thresholds of at least one of the M candidate pixel threshold pairs having an asymmetric relationship, and M being a positive integer greater than 1;

the determining module 12 is configured to determine distortion costs caused by correcting a target reconstructed video frame respectively according to the M candidate pixel threshold pairs in a target correction mode, to obtain M distortion costs, the target reconstructed video frame belonging to the reconstructed video data;

the screening module 13 is configured to screen, according to the M distortion costs, a target pixel threshold pair of the reconstructed video data in the target correction mode from the M candidate pixel threshold pairs; and the first correction module 14 is configured to correct reconstructed video frames in the reconstructed video data according to the target pixel threshold pair in the target correction mode, to obtain a target correction result of the reconstructed video data.

The M candidate pixel threshold pairs include a first candidate pixel threshold pair, and two candidate pixel thresholds in the first candidate pixel threshold pair have an asymmetric relationship.

The two candidate pixel thresholds in the first candidate pixel threshold pair are generated according to different candidate pixel thresholds in a same candidate pixel threshold interval; or the two candidate pixel thresholds in the first candidate pixel threshold pair are generated according to candidate pixel thresholds in different candidate pixel threshold intervals, and the candidate pixel thresholds in the different candidate pixel threshold intervals are different.

The M candidate pixel threshold pairs further include a second candidate pixel threshold pair, and two candidate pixel thresholds in the second candidate pixel threshold pair have a symmetric relationship.

The two candidate pixel thresholds in the second candidate pixel threshold pair are generated according to a same candidate pixel threshold in a same candidate pixel threshold interval.

The first obtaining module 11 includes:

a first determining unit 1101, configured to determine a distortion cost caused by using a symmetric pixel threshold pair $P_k$ to correct the target reconstructed video frame in the target correction mode, where the symmetric pixel threshold pair $P_k$ belongs to P symmetric pixel threshold pairs, two candidate pixel thresholds in the symmetric pixel threshold pair of the P symmetric pixel threshold pairs have a symmetric relationship, P is a positive integer greater than 1, and k is a positive integer less than or equal to P;

a selection unit 1102, configured to select, if P distortion costs corresponding to the P symmetric pixel threshold pairs are obtained, an initial pixel threshold pair of the target reconstructed video frame in the target correction mode from the P symmetric pixel threshold pairs according to the P distortion costs; and an adjustment unit 1103, configured to adjust the initial pixel threshold pair according to adjustment steps in an adjustment step set, to obtain the M candidate pixel threshold pairs.

The M candidate pixel threshold pairs include a third candidate pixel threshold pair, and two candidate pixel thresholds in the third candidate pixel threshold pair have an asymmetric relationship.

One candidate pixel threshold in the third candidate pixel threshold pair is obtained by adjusting a first initial pixel threshold in the initial pixel threshold pair according to a first adjustment step in the adjustment step set.

The other candidate pixel threshold in the third candidate pixel threshold pair is obtained by adjusting a second initial pixel threshold in the initial pixel threshold pair according to a second adjustment step in the adjustment step set.

The M candidate pixel threshold pairs further include a fourth candidate pixel threshold pair, and two candidate pixel thresholds in the fourth candidate pixel threshold pair have a symmetric relationship.

One candidate pixel threshold in the fourth candidate pixel threshold pair is obtained by adjusting the first initial pixel threshold according to a third adjustment step in the adjustment step set, and the other candidate pixel threshold in the fourth candidate pixel threshold pair is obtained by adjusting the second initial pixel threshold according to an opposite number of the third adjustment step.

The determining module 12 includes:

a first correction unit 1201, configured to correct, in the target correction mode, a reconstructed pixel value of the target reconstructed video frame respectively according to the M candidate pixel threshold pairs, to obtain M correction results, where a second determining unit 1202, configured to determining, according to the M correction results, distortion costs caused by correcting the target reconstructed video frame respectively by using the M candidate pixel threshold pairs in the target correction mode, to obtain M distortion costs.

The first correction unit 1201 may be configured to:

obtain a target reconstructed pixel point in the target reconstructed video frame, and determine a reference pixel point of the target reconstructed pixel point in the target correction mode from the target reconstructed video frame;

determine, according to the reference pixel point, the target reconstructed pixel point, and the M candidate pixel threshold pairs, correction categories respectively corresponding to the target reconstructed pixel point under the M candidate pixel threshold pairs, to obtain M correction categories; and correct the reconstructed pixel value of the target reconstructed pixel point respectively according to the M correction categories, to obtain M correction results.

The determining, according to the reference pixel point, the target reconstructed pixel point, and the M candidate pixel threshold pairs, correction categories respectively corresponding to the target reconstructed pixel point under the M candidate pixel threshold pairs includes:

determining a pixel difference between the reconstructed pixel value of the target reconstructed pixel point and a reconstructed pixel value of the reference pixel point;

comparing the pixel difference with the M candidate pixel threshold pairs respectively, to obtain comparison results respectively corresponding to the M candidate pixel threshold pairs; and determining, according to a comparison result corresponding to a candidate pixel threshold pair $P_i$, a correction category corresponding to the target reconstructed pixel point under the candidate pixel threshold pair $P_i$, where the candidate pixel threshold pair $P_i$ belongs to the M candidate pixel threshold pairs, and i is a positive integer less than or equal to M, until correction categories respectively corresponding to the target reconstructed pixel point under the M candidate pixel threshold pairs are obtained.

The reference pixel point includes a first reference pixel point and a second reference pixel point, the pixel difference includes a first pixel difference and a second pixel difference, the first pixel difference is a pixel difference between a reconstructed pixel value of the first reference pixel point and the reconstructed pixel value of the target reconstructed pixel point, and the second pixel difference is a pixel difference between a reconstructed pixel value of the second reference pixel point and the reconstructed pixel value of the target reconstructed pixel point.

The comparing the pixel difference with the M candidate pixel threshold pairs respectively, to obtain comparison results respectively corresponding to the M candidate pixel threshold pairs includes:

obtaining a quantity of correction categories in the target correction mode, and obtaining a first comparison result between the first pixel difference and the candidate pixel threshold pair $P_i$ according to the quantity of correction categories in the target correction mode;

obtaining a second comparison result between the second pixel difference and the candidate pixel threshold pair $P_i$ according to the quantity of correction categories in the target correction mode; and using the first comparison result and the second comparison result as the comparison result corresponding to the candidate pixel threshold pair $P_i$, until the comparison results respectively corresponding to the M candidate pixel threshold pairs are obtained.

The determining, according to a comparison result corresponding to a candidate pixel threshold pair $P_i$, a correction category corresponding to the target reconstructed pixel point under the candidate pixel threshold pair $P_i$ includes:

determining a first category indication value of the target reconstructed pixel point under the candidate pixel threshold pair $P_i$ according to the first comparison result;

determining a second category indication value of the target reconstructed pixel point under the candidate pixel threshold pair $P_i$ according to the second comparison result; and determining a correction category of the target reconstructed pixel point under the candidate pixel threshold pair $P_i$ according to the first category indication value and the second category indication value.

The candidate pixel threshold pair $P_i$ includes a first candidate pixel threshold and a second candidate pixel threshold, the first candidate pixel threshold is less than the second candidate pixel threshold, and the quantity of correction categories is four.

The determining a first category indication value of the target reconstructed pixel point under the candidate pixel threshold pair $P_i$ according to the first comparison result includes:

determining a first value as the first category indication value of the target reconstructed pixel point under the candidate pixel threshold pair $P_i$ if the first comparison result indicates that the first pixel difference is a negative number and the first pixel difference is less than the first candidate pixel threshold;

determining a second value as the first category indication value of the target reconstructed pixel point under the candidate pixel threshold pair $P_i$ if the first comparison result indicates that the first pixel difference is a negative number and the first pixel difference is greater than or equal to the first candidate pixel threshold;

determining a third value as the first category indication value of the target reconstructed pixel point under the candidate pixel threshold pair $P_i$ if the first comparison result indicates that the first pixel difference is not a negative number and the first pixel difference is less than the second candidate pixel threshold; and determining a fourth value as the first category indication value of the target reconstructed pixel point under the candidate pixel threshold pair $P_i$ if the first comparison result indicates that the first pixel difference is a positive number and the first pixel difference is less than the second candidate pixel threshold. The first value, the second value, the third value, and the fourth value respectively correspond to four correction categories.

The candidate pixel threshold pair $P_i$ includes a first candidate pixel threshold and a second candidate pixel threshold, the first candidate pixel threshold is less than the second candidate pixel threshold, and the quantity of correction categories is three.

The determining a first category indication value of the target reconstructed pixel point under the candidate pixel threshold pair $P_i$ according to the first comparison result includes:

determining a fifth value as the first category indication value of the target reconstructed pixel point under the candidate pixel threshold pair $P_i$ if the first comparison result indicates that the first pixel difference is less than the first candidate pixel threshold;

determining a sixth value as the first category indication value of the target reconstructed pixel point under the candidate pixel threshold pair $P_i$ if the first comparison result indicates that the first pixel difference is greater than the second candidate pixel threshold; and determining a seventh value as the first category indication value of the target reconstructed pixel point under the candidate pixel threshold pair $P_i$ if the first comparison result indicates that the first pixel difference is equal to the first candidate pixel threshold or the first pixel difference is equal to the second candidate pixel threshold; or determining a seventh value as the first category indication value of the target reconstructed pixel point under the candidate pixel threshold pair $P_i$ if the first comparison result indicates that the first pixel difference is greater than the first candidate pixel threshold and the first pixel difference is less than the second candidate pixel threshold. The fifth value, the sixth value, and the seventh value respectively correspond to three correction categories.

The correcting the reconstructed pixel value of the target reconstructed pixel point respectively according to the M correction categories, to obtain M correction results includes:

querying a correction value table for pixel correction amounts respectively corresponding to the M correction categories, to obtain M pixel correction amounts; and correcting the reconstructed pixel value of the target reconstructed pixel point respectively by using the M pixel correction amounts, to obtain M correction results.

The second determining unit 1202 may be configured to:

determine a pixel distortion rate of the target reconstructed video frame under the candidate pixel threshold pair $P_i$ according to a corrected target reconstructed video frame included in a correction result $Q_i$ and an original video frame corresponding to the target reconstructed video frame, where the candidate pixel threshold pair $P_i$ belongs to the M candidate pixel threshold pairs, i is a positive integer less than or equal to M, the correction result $Q_i$ is a correction result obtained by using the candidate pixel threshold pair $P_i$ to correct the target reconstructed video frame, and the target reconstructed video frame is obtained by reconstructing encoded video data of the original video frame; and obtain an encoding bit rate of the candidate pixel threshold pair $P_i$, and determine a distortion cost of the target reconstructed video frame under the candidate pixel threshold pair $P_i$ based on the pixel distortion rate of the target reconstructed video frame under the candidate pixel threshold pair $P_i$ and the encoding bit rate of the candidate pixel threshold pair $P_i$, until distortion costs respectively corresponding to the target reconstructed video frame under the M candidate pixel threshold pairs are obtained, to obtain M distortion costs.

The screening module 13 includes:

a screening unit 1301, configured to screen, according to the M distortion costs, a candidate pixel threshold pair with a smallest distortion cost from the M candidate pixel threshold pairs; and a third determining unit 1302, configured to determine the screened candidate pixel threshold pair as the target pixel threshold pair of the reconstructed video data in the target correction mode.

A quantity of target correction modes is N, and N is a positive integer.

The first correction module 14 includes:

a second correction unit 1401, configured to correct a reconstructed pixel value of a reconstructed video frame of the reconstructed video data according to a target pixel threshold pair in a target correction mode $Y_j$, to obtain a correction result of the reconstructed video frame of the reconstructed video data in the target correction mode $Y_j$, where the target correction mode $Y_j$ belongs to the N target correction modes, and j is a positive integer less than or equal to N;

a fourth determining unit 1402, configured to determine a distortion cost of the reconstructed video frame of the reconstructed video data in the target correction mode $Y_j$ according to the correction result of the reconstructed video frame of the reconstructed video data in the target correction mode $Y_j$; and a fifth determining unit 1403, configured to determine, if N distortion costs corresponding to the reconstructed video frame of the reconstructed video data in the N target correction modes are obtained, a correction result corresponding to a smallest distortion cost in the N distortion costs as a target correction result of the reconstructed video frame of the reconstructed video data.

The video data processing apparatus 1 further includes:

a transmission module 15, configured to transmit a first pixel threshold and a second pixel threshold of the target pixel threshold pair in the target correction mode to a decoding device, where the decoding device is configured to determine the target correction result of the reconstructed video data according to the first pixel threshold and the second pixel threshold of the target pixel threshold pair in the target correction mode.

The transmission module 15 includes:

a first obtaining unit 1501, configured to obtain a first threshold index of a first absolute value of the first pixel threshold in a first candidate pixel threshold interval and a second threshold index of a second absolute value of the second pixel threshold in a second candidate pixel threshold interval; and a first transmission unit 1502, configured to transmit the first threshold index corresponding to the first pixel threshold and the second threshold index corresponding to the second pixel threshold to the decoding device.

The transmission module 15 includes:

a second obtaining unit 1503, configured to obtain a first threshold index of a first absolute value of the first pixel threshold in a first candidate pixel threshold interval and a second threshold index of a second absolute value of the second pixel threshold in a second candidate pixel threshold interval; and a third obtaining unit 1504, configured to obtain an index difference between the first threshold index and the second threshold index; and a second transmission unit 1505, configured to transmit the first threshold index and the index difference to the decoding device, or transmit the second threshold index and the index difference to the decoding device.

The transmission module 15 includes:

a first generation unit 1506, configured to generate a first indication identifier corresponding to a first absolute value of the first pixel threshold, where the first indication identifier is configured for indicating that the first absolute value is an absolute value of the first pixel threshold;

a second generation unit 1507, configured to generate a second indication identifier corresponding to a second absolute value of the second pixel threshold, where the second indication identifier is configured for indicating that the second absolute value is an absolute value of the second pixel threshold; and a third transmission unit 1508, configured to transmit the first absolute value, the first indication identifier, the second absolute value, and the second indication identifier to the decoding device.

The transmission module 15 includes:

a third generation unit 1509, configured to generate a first indication identifier of a first absolute value corresponding to the first pixel threshold, where the first indication identifier is configured for indicating that the first absolute value is an absolute value of the first pixel threshold;

a fourth generation unit 1510, configured to generate a second indication identifier of a second absolute value corresponding to the second pixel threshold, where the second indication identifier is configured for indicating that the second absolute value is an absolute value of the second pixel threshold;

a fourth obtaining unit 1511, configured to obtain a target difference between the first absolute value and the second absolute value; and a fourth transmission unit 1512, configured to transmit the first absolute value, the first indication identifier, and the target difference to the decoding device, or transmit the second absolute value, the second indication identifier, and the target difference to the decoding device.

In some embodiments, there is an asymmetric relationship between two candidate pixel thresholds of at least one candidate pixel threshold pair in the M candidate pixel threshold pairs for screening, for example, all candidate pixel threshold pairs in the M candidate pixel threshold pairs are asymmetric candidate pixel threshold pairs, or the M candidate pixel threshold pairs, one part of the candidate pixel threshold pairs are symmetric candidate pixel threshold pairs and the other part of the candidate pixel threshold pairs are asymmetric candidate pixel threshold pairs, which expands a range for screening and facilitates screening of an optimal candidate pixel threshold pair. In a process of screening an optimal candidate pixel threshold pair, an optimal candidate pixel threshold pair (for example, a target pixel threshold pair) of the reconstructed video data in the target correction mode is screened from the M candidate pixel threshold pairs by using distortion costs (for example, correction effects) respectively corresponding to the M candidate pixel threshold pairs, which may improve accuracy of screening the candidate pixel threshold pair. The distortion cost corresponding to the candidate pixel threshold pair herein refers to a distortion cost caused by correcting the target reconstructed video frame according to the candidate pixel threshold pair in the target correction mode. Further, the reconstructed video frame in the reconstructed video data is corrected according to the optimal candidate pixel threshold pair in the target correction mode, to obtain the target correction result of the reconstructed video data, which may improve the correction accuracy of the reconstructed video data. The target correction result of the reconstructed video data is used as reference data in an encoding process of a subsequent video frame. Therefore, the encoding performance of the subsequent video frame may be improved. In addition, the target pixel threshold pair in the target correction mode is determined according to the distortion cost corresponding to each candidate pixel threshold pair, and the reconstructed video frame in the reconstructed video data is corrected according to the target pixel threshold pair with high accuracy, so that the accuracy of correcting the reconstructed video data may be improved. In addition, some embodiments may reduce transmission overhead of transmitting the target pixel threshold pair in the target correction mode to the decoding device.

Figure 9:
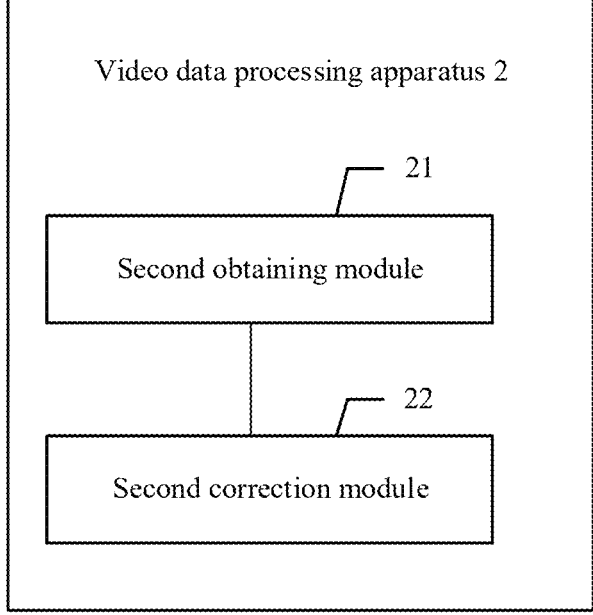
FIG. 9 is a schematic structural diagram of a video data processing apparatus according to some embodiments.

FIG. 9 is a schematic structural diagram of a video data processing apparatus 2 according to some embodiments. The foregoing video data processing apparatus 2 may be a computer program (including program code) running in a computer device. For example, the video data processing apparatus 2 is application software. The video data processing apparatus 2 may be configured to perform corresponding operations in the video data processing method provided in some embodiments. As shown in FIG. 9, the video data processing apparatus 2 may include: a second obtaining module 21 and a second correction module 22.

The second obtaining module 21 is configured to obtain to-be-corrected reconstructed video data, and obtain a target pixel threshold pair of the reconstructed video data in a target correction mode, the target pixel threshold pair in the target correction mode being obtained by screening M candidate pixel threshold pairs according to M distortion costs, the M distortion costs including distortion costs caused by correcting a target reconstructed video frame respectively according to the M candidate pixel threshold pairs in the target correction mode, the target reconstructed video frame belonging to the reconstructed video data, and two candidate pixel thresholds of at least one of the M candidate pixel threshold pairs having an asymmetric relationship; and the second correction module 22 is configured to correct reconstructed video frames in the reconstructed video data according to the target pixel threshold pair in the target correction mode, to obtain a target correction result of the reconstructed video data.

The target pixel threshold pair of the reconstructed video data in the target correction mode is transmitted by an encoding device.

The M candidate pixel threshold pairs include a first candidate pixel threshold pair, and two candidate pixel thresholds in the first candidate pixel threshold pair have an asymmetric relationship.

The two candidate pixel thresholds in the first candidate pixel threshold pair are generated according to different candidate pixel thresholds in a same candidate pixel threshold interval; or the two candidate pixel thresholds in the first candidate pixel threshold pair are generated according to candidate pixel thresholds in different candidate pixel threshold intervals, and the candidate pixel thresholds in the different candidate pixel threshold intervals are different.

The M candidate pixel threshold pairs further include a second candidate pixel threshold pair, and two candidate pixel thresholds in the second candidate pixel threshold pair have a symmetric relationship.

The two candidate pixel thresholds in the second candidate pixel threshold pair are generated according to a same candidate pixel threshold in a same candidate pixel threshold interval.

The M candidate pixel threshold pairs are obtained by adjusting an initial pixel threshold pair based on adjustment steps in an adjustment step set.

The initial pixel threshold pair is selected from P symmetric pixel threshold pairs based on P distortion costs corresponding to the P symmetric pixel threshold pairs; and one symmetric pixel threshold pair corresponds to one distortion cost, two candidate pixel thresholds included in one symmetric pixel threshold pair of the P symmetric pixel threshold pairs have a symmetric relationship, and P is a positive integer greater than 1.

A distortion cost corresponding to a symmetric pixel threshold pair $P_k$ is a distortion cost caused by using the symmetric pixel threshold pair $P_k$ to correct the target reconstructed video frame; and the symmetric pixel threshold pair $P_k$ belongs to the P symmetric pixel threshold pairs, and k is a positive integer less than or equal to P.

The M candidate pixel threshold pairs include a third candidate pixel threshold pair, and two candidate pixel thresholds in the third candidate pixel threshold pair have an asymmetric relationship.

One candidate pixel threshold in the third candidate pixel threshold pair is obtained by adjusting a first initial pixel threshold in the initial pixel threshold pair according to a first adjustment step in the adjustment step set.

The other candidate pixel threshold in the third candidate pixel threshold pair is obtained by adjusting a second initial pixel threshold in the initial pixel threshold pair according to a second adjustment step in the adjustment step set.

The M candidate pixel threshold pairs further include a fourth candidate pixel threshold pair, and two candidate pixel thresholds in the fourth candidate pixel threshold pair have a symmetric relationship.

One candidate pixel threshold in the fourth candidate pixel threshold pair is obtained by adjusting the first initial pixel threshold according to a third adjustment step in the adjustment step set, and the other candidate pixel threshold in the fourth candidate pixel threshold pair is obtained by adjusting the second initial pixel threshold according to the third adjustment step.

In some embodiments, to-be-corrected reconstructed video data is obtained, and a target pixel threshold pair of the reconstructed video data in a target correction mode is obtained; and reconstructed video frames in the reconstructed video data are corrected according to the target pixel threshold pair in the target correction mode, to obtain a target correction result of the reconstructed video data. The target pixel threshold pair in the target correction mode is screened from M candidate pixel threshold pairs according to M distortion costs, there is an asymmetric relationship between two candidate pixel thresholds of at least one candidate pixel threshold pair in the M candidate pixel threshold pairs for screening, for example, all candidate pixel threshold pairs in the M candidate pixel threshold pairs are asymmetric candidate pixel threshold pairs, or the M candidate pixel threshold pairs, one part of the candidate pixel threshold pairs are symmetric candidate pixel threshold pairs and the other part of the candidate pixel threshold pairs are asymmetric candidate pixel threshold pairs, which expands a range for screening and facilitates screening of an optimal candidate pixel threshold pair. In a process of screening an optimal candidate pixel threshold pair, an optimal candidate pixel threshold pair (for example, a target pixel threshold pair) of the reconstructed video data in the target correction mode is screened from the M candidate pixel threshold pairs by using distortion costs (for example, correction effects) respectively corresponding to the M candidate pixel threshold pairs, which may improve accuracy of screening the candidate pixel threshold pair. The distortion cost corresponding to the candidate pixel threshold pair herein refers to a distortion cost caused by correcting the target reconstructed video frame according to the candidate pixel threshold pair in the target correction mode. Further, the reconstructed video frame in the reconstructed video data is corrected according to the optimal candidate pixel threshold pair in the target correction mode, to obtain the target correction result of the reconstructed video data, which may improve the correction accuracy of the reconstructed video data. The target correction result of the reconstructed video data is used as decoded video data of the encoded video data, and may also be used as reference data in a decoding process of subsequent encoded video data, which may improve decoding performance of the subsequent encoded video data.

According to some embodiments, each module or unit may exist respectively or be combined into one or more units. Some modules or units may be further split into multiple smaller function subunits, thereby implementing the same operations without affecting the technical effects of some embodiments. The modules or units are divided based on logical functions. In actual applications, a function of one module or unit may be realized by multiple modules or units, or functions of multiple modules or units may be realized by one module or unit. In some embodiments, the apparatus may further include other modules or units. In actual applications, these functions may also be realized cooperatively by the other modules or units, and may be realized cooperatively by multiple modules or units.

A person skilled in the art would understand that these "modules" or "units" could be implemented by hardware logic, a processor or processors executing computer software code, or a combination of both. The "modules" or "units" may also be implemented in software stored in a memory of a computer or a non-transitory computer-readable medium, where the instructions of each unit are executable by a processor to thereby cause the processor to perform the respective operations of the corresponding module or unit.

Figure 10:
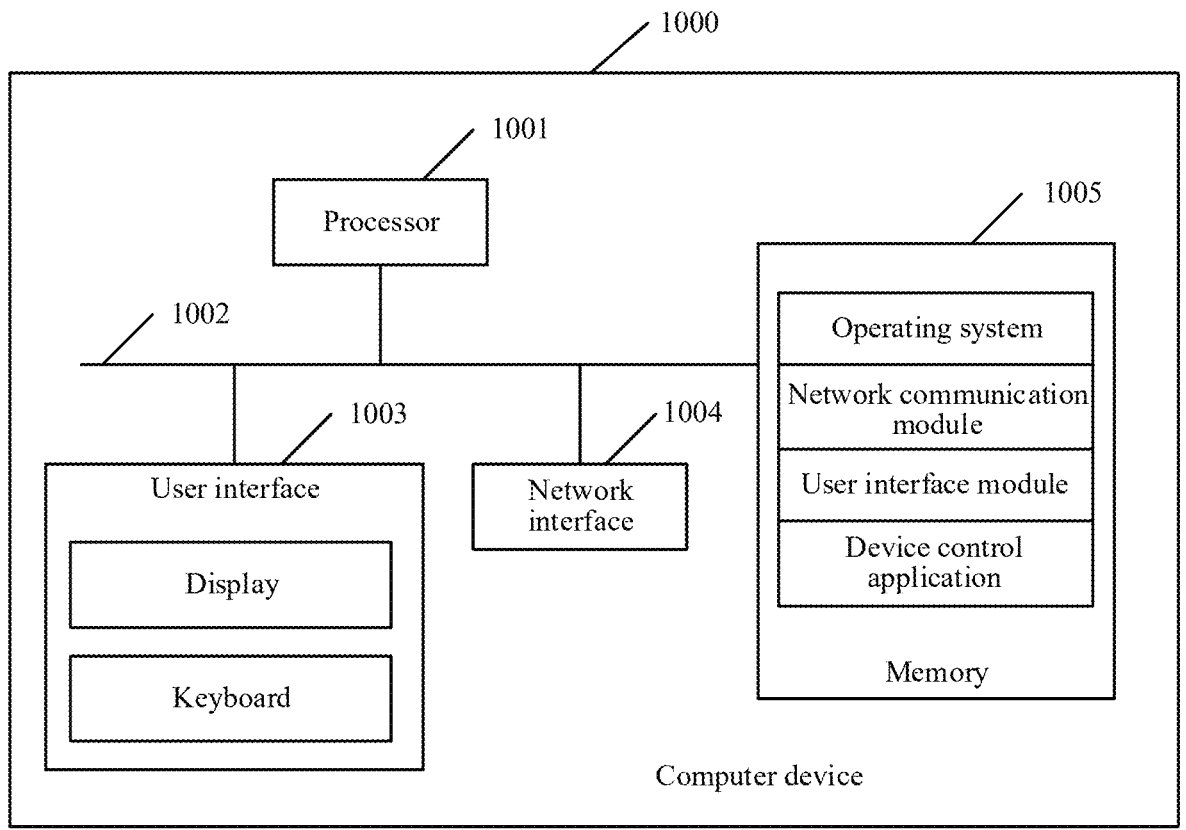
FIG. 10 is a schematic structural diagram of a computer device according to some embodiments.

FIG. 10 is a schematic structural diagram of a computer device according to some embodiments. As shown in FIG. 10, the computer device 1000 may include: a processor 1001, a network interface 1004, and a memory 1005, as well as the computer device 1000 may further include: a user interface 1003 and at least one communication bus 1002. The communications bus 1002 is configured to implement connection and communication between the components. The user interface 1003 may include a display, a keyboard, and in some embodiments, the user interface 1003 may further include a standard wired interface and a standard wireless interface. In some embodiments, the network interface 1004 may include a standard wired interface and a standard wireless interface (such as a Wi-Fi interface). The memory 1005 may be a high-speed random access memory (RAM), or may be a non-volatile memory, for example, at least one magnetic disk memory. In some embodiments, the memory 1005 may further be at least one storage apparatus that is located far away from the processor 1001. As shown in FIG. 10, the memory 1005 used as a computer-readable storage medium may include an operating system, a network communication module, a user interface module, and a device-control application.

In the computer device 1000 shown in FIG. 10, the network interface 1004 may provide a network communication function, the user interface 1003 is configured to provide an input interface for a user, and the processor 1001 may be configured to invoke the device-control application stored in the memory 1005, to implement the following operations:

obtaining to-be-corrected reconstructed video data, and obtaining M candidate pixel threshold pairs, two candidate pixel thresholds of at least one of the M candidate pixel threshold pairs having an asymmetric relationship, and M being a positive integer greater than 1;

determining distortion costs caused by correcting a target reconstructed video frame respectively according to the M candidate pixel threshold pairs in a target correction mode, to obtain M distortion costs, the target reconstructed video frame belonging to the reconstructed video data;

screening, according to the M distortion costs, a target pixel threshold pair of the reconstructed video data in the target correction mode from the M candidate pixel threshold pairs; and correcting reconstructed video frames in the reconstructed video data according to the target pixel threshold pair in the target correction mode, to obtain a target correction result of the reconstructed video data.

The computer device 1000 described in some embodiments can implement the descriptions of the video data processing method in the foregoing embodiment corresponding to FIG. 5, and can also implement the descriptions of the video data processing apparatus in the foregoing embodiment corresponding to FIG. 8.

Figure 11:
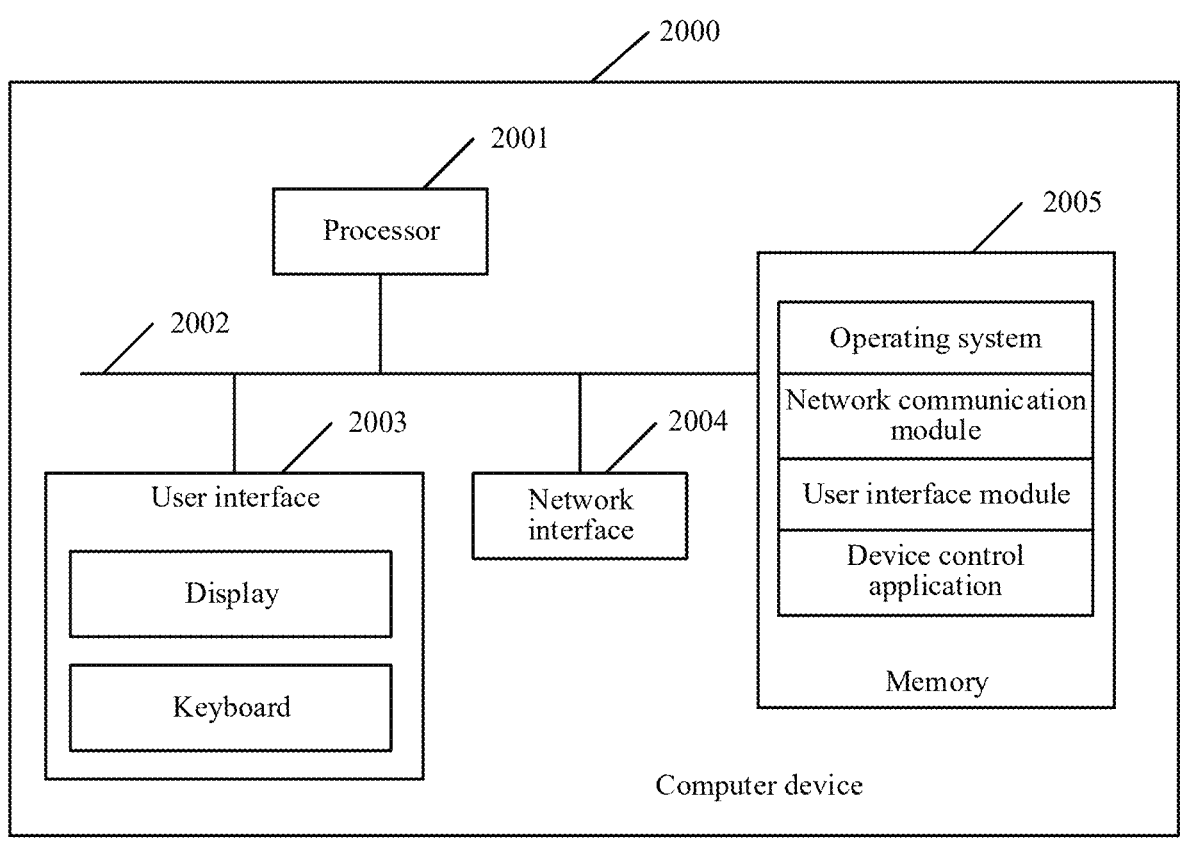
FIG. 11 is a schematic structural diagram of a computer device according to some embodiments.

FIG. 11 is a schematic structural diagram of a computer device according to some embodiments. As shown in FIG. 11, the computer device 2000 may include: a processor 2001, a network interface 2004, and a memory 2005, as well as the computer device 2000 may further include: a user interface 2003 and at least one communication bus 2002. The communications bus 2002 is configured to implement connection and communication between the components. The user interface 2003 may include a display, a keyboard, and in some embodiments, the user interface 2003 may further include a standard wired interface and a standard wireless interface. In some embodiments, the network interface 2004 may include a standard wired interface and a standard wireless interface (such as a Wi-Fi interface). The memory 2005 may be a high-speed random access memory (RAM), or may be a non-volatile memory, for example, at least one magnetic disk memory. In some embodiments, the memory 2005 may further be at least one storage apparatus that is located far away from the processor 2001. As shown in FIG. 11, the memory 2005 used as a computer-readable storage medium may include an operating system, a network communication module, a user interface module, and a device-control application.

In the computer device 2000 shown in FIG. 11, the network interface 2004 may provide a network communication function, the user interface 2003 is configured to provide an input interface for a user, and the processor 2001 may be configured to invoke the device-control application stored in the memory 2005, to implement the following operations:

obtaining to-be-corrected reconstructed video data, and obtaining a target pixel threshold pair of the reconstructed video data in a target correction mode, the target pixel threshold pair in the target correction mode being screened from M candidate pixel threshold pairs according to M distortion costs, the M distortion costs including distortion costs caused by correcting a target reconstructed video frame respectively according to the M candidate pixel threshold pairs in the target correction mode, the target reconstructed video frame belonging to the reconstructed video data, and two candidate pixel thresholds of at least one of the M candidate pixel threshold pairs having an asymmetric relationship; and correcting reconstructed video frames in the reconstructed video data according to the target pixel threshold pair in the target correction mode, to obtain a target correction result of the reconstructed video data.

The computer device 2000 described in some embodiments can implement the descriptions of the video data processing method in the foregoing embodiment corresponding to FIG. 7, and can also implement the descriptions of the video data processing apparatus in the foregoing embodiment corresponding to FIG. 9.

In addition, some embodiments further provides a computer-readable storage medium. The computer-readable storage medium stores a computer program executed by the video data processing apparatus mentioned above, and the computer program includes program instructions. When executing the program instructions, the processor can perform the descriptions of the video data processing method in the embodiments corresponding to FIG. 5 or the video data processing method in the embodiments corresponding to FIG. 7.

For technical details of the computer-readable storage medium, reference may be made to the descriptions of the method according to some embodiments. In an example, the program instructions may be deployed to be executed on a computer device, or deployed to be executed on a plurality of computer devices at the same location, or deployed to be executed on a plurality of computer devices that are distributed in a plurality of locations and interconnected by using a communication network. A plurality of computer devices distributed at a plurality of locations and interconnected through a communication network may form a blockchain system.

In addition, some embodiments further provide a computer program product or a computer program. The computer program product or the computer program may include computer instructions, and the computer instructions may be stored in a computer-readable storage medium. A processor of a computer device reads the computer instructions from the computer-readable storage medium, and the processor may execute the computer instructions, to cause the computer device to perform the descriptions of the video data processing method in the embodiments corresponding to FIG. 5 or the video data processing method in the embodiments corresponding to FIG. 7. For technical details of the computer program product, reference may be made to the descriptions of the method according to some embodiments.

For ease of description, the foregoing method embodiments are described as a series of action combinations. However, persons skilled in the art are to know that the disclosure is not limited to the described order of the actions because some operations may be performed in another order or performed at the same time. In addition, a person skilled in the art is also to learn that the embodiments described are exemplary embodiments.

A sequence of the operations of the method in some embodiments may be adjusted, and operations may also be combined.

Persons of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The foregoing storage medium may be a magnetic disk, an optical disc, a read-only memory (ROM), a random access memory (RAM), or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A video data processing method, performed by a computer device, comprising:

obtaining reconstructed video data;

obtaining one or more candidate pixel threshold pairs, wherein at least one of the one or more candidate pixel threshold pairs comprise two candidate pixel thresholds having first relationship that is asymmetric;

determining one or more distortion costs associated with correcting a target reconstructed video frame of the reconstructed video data in a target correction mode according to the one or more candidate pixel threshold pairs;

screening, according to the one or more distortion costs, a target pixel threshold pair of the reconstructed video data, in the target correction mode, from the one or more candidate pixel threshold pairs; and obtaining a target correction result of the reconstructed video data by correcting, in the target correction mode according to the target pixel threshold pair, one or more reconstructed video frames of the reconstructed video data.

2. The video data processing method according to claim 1, wherein the one or more candidate pixel threshold pairs comprise a first candidate pixel threshold pair, and the first candidate pixel threshold pair comprises two first candidate pixel thresholds having a first asymmetric relationship, wherein the two first candidate pixel thresholds are generated according to different candidate pixel thresholds in a same candidate pixel threshold interval; or the two first candidate pixel thresholds are generated according to candidate pixel thresholds in different candidate pixel threshold intervals, and the candidate pixel thresholds in the different candidate pixel threshold intervals are different.

3. The video data processing method according to claim 2, wherein the one or more candidate pixel threshold pairs further comprise a second candidate pixel threshold pair comprising two second candidate pixel thresholds having a second relationship that is symmetric, wherein the two second candidate pixel thresholds are generated according to a same candidate pixel threshold in a same candidate pixel threshold interval.

4. The video data processing method according to claim 1, wherein the obtaining the one or more candidate pixel threshold pairs comprises:

determining a distortion cost caused by using a symmetric pixel threshold pair, from among one or more symmetric pixel threshold pairs, to correct the target reconstructed video frame in the target correction mode, wherein the symmetric pixel threshold pair comprises two first candidate pixel thresholds having a second relationship that is symmetric;

selecting, based on one or more first distortion costs corresponding to the one or more symmetric pixel threshold pairs being obtained, an initial pixel threshold pair of the target reconstructed video frame from the one or more symmetric pixel threshold pairs according to the one or more first distortion costs; and adjusting the initial pixel threshold pair according to a plurality of adjustment steps in an adjustment step set, to obtain the one or more candidate pixel threshold pairs.

5. The video data processing method according to claim 4, wherein the one or more candidate pixel threshold pairs comprise a third candidate pixel threshold pair comprising two third candidate pixel thresholds having a third relationship that is asymmetric, wherein a first threshold of the third candidate pixel threshold pair is obtained by adjusting a first initial pixel threshold in the initial pixel threshold pair according to a first adjustment step of the adjustment step set, and wherein a second threshold of the third candidate pixel threshold pair is obtained by adjusting a second initial pixel threshold in the initial pixel threshold pair according to a second adjustment step of the adjustment step set.

6. The video data processing method according to claim 5, wherein the one or more candidate pixel threshold pairs further comprise a fourth candidate pixel threshold pair comprising two fourth candidate pixel thresholds having a fourth relationship that is symmetric, wherein a third candidate pixel threshold of the fourth candidate pixel threshold pair is obtained by adjusting the first initial pixel threshold according to a third adjustment step of the adjustment step set, and wherein a fourth candidate pixel threshold in the fourth candidate pixel threshold pair is obtained by adjusting the second initial pixel threshold according to an opposite number of the third adjustment step.

7. The video data processing method according to claim 1, wherein the determining the one or more distortion costs comprises:

obtaining one or more correction results by correcting, in the target correction mode, a first reconstructed pixel value of the target reconstructed video frame according to the one or more candidate pixel threshold pairs; and determining, according to the one or more correction results, distortion costs associated with correcting, in the target correction mode, the target reconstructed video frame based on the one or more candidate pixel threshold pairs, to obtain the one or more distortion costs.

8. The video data processing method according to claim 7, wherein the obtaining the one or more correction results comprises:

obtaining a target reconstructed pixel point in the target reconstructed video frame;

determining, in the target correction mode, a reference pixel point of the target reconstructed pixel point from the target reconstructed video frame;

determining one or more correction categories corresponding to the target reconstructed pixel point based on the reference pixel point, the target reconstructed pixel point, and the one or more candidate pixel threshold pairs; and obtaining the one or more correction results by correcting the first reconstructed pixel value according to the one or more correction categories.

9. The video data processing method according to claim 8, wherein the determining the one or more correction categories comprises:

determining a pixel difference between the first reconstructed pixel value and a second reconstructed pixel value of the reference pixel point;

obtaining one or more comparison results corresponding to the one or more candidate pixel threshold pairs by comparing the pixel difference with the one or more candidate pixel threshold pairs; and obtaining the one or more correction categories by performing, for each of the one or more candidate pixel threshold pairs:

determining, based on a first comparison result corresponding to a first candidate pixel threshold pair from among the one or more candidate pixel threshold pairs, a correction category corresponding to the target reconstructed pixel point, wherein the first candidate pixel threshold pair belongs to the one or more candidate pixel threshold pairs.

10. The video data processing method according to claim 9, wherein the reference pixel point comprises a first reference pixel point and a second reference pixel point, the pixel difference comprises a first pixel difference and a second pixel difference, the first pixel difference is between a third reconstructed pixel value of the first reference pixel point and the first reconstructed pixel value, and the second pixel difference is between a fourth reconstructed pixel value of the second reference pixel point and the first reconstructed pixel value, and wherein the obtaining the one or more comparison results comprises performing, for each of the one or more candidate pixel threshold pairs:

obtaining a quantity of correction categories in the target correction mode, and obtaining a second comparison result between the first pixel difference and the first candidate pixel threshold pair according to the quantity of correction categories;

obtaining a third comparison result between the second pixel difference and the first candidate pixel threshold pair according to the quantity of correction categories; and using the second comparison result and the third comparison result as the first comparison result.

11. A video data processing apparatus, comprising:

at least one memory configured to store computer program code; and at least one processor configured to read the program code and operate as instructed by the program code, the program code comprising:

first obtaining code configured to cause at least one of the at least one processor to obtain reconstructed video data;

second obtaining code configured to cause at least one of the at least one processor to obtain one or more candidate pixel threshold pairs, wherein at least one of the one or more candidate pixel threshold pairs comprise two candidate pixel thresholds having a first relationship that is asymmetric;

first determining code configured to cause at least one of the at least one processor to determine one or more distortion costs associated with correcting a target reconstructed video frame of the reconstructed video data in a target correction mode according to the one or more candidate pixel threshold pairs;

first screening code configured to cause at least one of the at least one processor to screen, according to the one or more distortion costs, a target pixel threshold pair of the reconstructed video data, in the target correction mode, from the one or more candidate pixel threshold pairs; and third obtaining code configured to cause at least one of the at least one processor to obtain a target correction result of the reconstructed video data by correcting, in the target correction mode according to the target pixel threshold pair, one or more reconstructed video frames of the reconstructed video data.

12. The video data processing apparatus according to claim 11, wherein the one or more candidate pixel threshold pairs comprise a first candidate pixel threshold pair, and the first candidate pixel threshold pair comprises two first candidate pixel thresholds having a first asymmetric relationship, wherein the two first candidate pixel thresholds are generated according to different candidate pixel thresholds in a same candidate pixel threshold interval; or the two first candidate pixel thresholds are generated according to candidate pixel thresholds in different candidate pixel threshold intervals, and the candidate pixel thresholds in the different candidate pixel threshold intervals are different.

13. The video data processing apparatus according to claim 12, wherein the one or more candidate pixel threshold pairs further comprise a second candidate pixel threshold pair comprising two second candidate pixel thresholds having a second relationship that is symmetric, wherein the two second candidate pixel thresholds are generated according to a same candidate pixel threshold in a same candidate pixel threshold interval.

14. The video data processing apparatus according to claim 11, wherein the second obtaining code comprises:

second determining code configured to cause at least one of the at least one processor to determine a distortion cost caused by using a symmetric pixel threshold pair, from among one or more symmetric pixel threshold pairs, to correct the target reconstructed video frame in the target correction mode, wherein the symmetric pixel threshold pair comprises two first candidate pixel thresholds having a second relationship that is symmetric;

second selecting code configured to cause at least one of the at least one processor to select, based on one or more first distortion costs corresponding to the one or more symmetric pixel threshold pairs being obtained, an initial pixel threshold pair of the target reconstructed video frame from the one or more symmetric pixel threshold pairs according to the one or more first distortion costs; and adjusting code configured to cause at least one of the at least one processor to adjust the initial pixel threshold pair according to a plurality of adjustment steps in an adjustment step set, to obtain the one or more candidate pixel threshold pairs.

15. The video data processing apparatus according to claim 14, wherein the one or more candidate pixel threshold pairs comprise a third candidate pixel threshold pair comprising two third candidate pixel thresholds having a third relationship that is asymmetric, wherein a first threshold of the third candidate pixel threshold pair is obtained by adjusting a first initial pixel threshold in the initial pixel threshold pair according to a first adjustment step of the adjustment step set, and wherein a second threshold of the third candidate pixel threshold pair is obtained by adjusting a second initial pixel threshold in the initial pixel threshold pair according to a second adjustment step of the adjustment step set.

16. The video data processing apparatus according to claim 15, wherein the one or more candidate pixel threshold pairs further comprise a fourth candidate pixel threshold pair comprising two fourth candidate pixel thresholds having a fourth relationship that is symmetric, wherein a third candidate pixel threshold of the fourth candidate pixel threshold pair is obtained by adjusting the first initial pixel threshold according to a third adjustment step of the adjustment step set, and wherein a fourth candidate pixel threshold in the fourth candidate pixel threshold pair is obtained by adjusting the second initial pixel threshold according to an opposite number of the third adjustment step.

17. The video data processing apparatus according to claim 11, wherein the first determining code comprises:

fourth obtaining code configured to cause at least one of the at least one processor to obtain one or more correction results by correcting, in the target correction mode, a first reconstructed pixel value of the target reconstructed video frame according to the one or more candidate pixel threshold pairs; and second determining code configured to cause at least one of the at least one processor to according to the one or more correction results, distortion costs associated with correcting, in the target correction mode, the target reconstructed video frame based on the one or more candidate pixel threshold pairs, to obtain the one or more distortion costs.

18. The video data processing apparatus according to claim 17, wherein the fourth obtaining code comprises:

fifth obtaining code configured to cause at least one of the at least one processor to obtain a target reconstructed pixel point in the target reconstructed video frame;

third determining code configured to cause at least one of the at least one processor to determine, in the target correction mode, a reference pixel point of the target reconstructed pixel point from the target reconstructed video frame;

fourth determining code configured to cause at least one of the at least one processor to determine one or more correction categories corresponding to the target reconstructed pixel point based on the reference pixel point, the target reconstructed pixel point, and the one or more candidate pixel threshold pairs; and sixth obtaining code configured to cause at least one of the at least one processor to obtain the one or more correction results by correcting the first reconstructed pixel value according to the one or more correction categories.

19. The video data processing apparatus according to claim 18, wherein the fourth determining code is configured to cause at least one of the at least one processor to:

determine a pixel difference between the first reconstructed pixel value and a second reconstructed pixel value of the reference pixel point;

obtain one or more comparison results corresponding to the one or more candidate pixel threshold pairs by comparing the pixel difference with the one or more candidate pixel threshold pairs; and obtain the one or more correction categories by performing, for each of the one or more candidate pixel threshold pairs:

determining, based on a first comparison result corresponding to a first candidate pixel threshold pair from among the one or more candidate pixel threshold pairs, a correction category corresponding to the target reconstructed pixel point, wherein the first candidate pixel threshold pair belongs to the one or more candidate pixel threshold pairs.

20. A non-transitory computer-readable storage medium, storing computer code which, when executed by at least one processor, causes the at least one processor to at least:

obtain reconstructed video data;

obtain one or more candidate pixel threshold pairs, wherein at least one of the one or more candidate pixel threshold pairs comprise two candidate pixel thresholds having a first relationship that is asymmetric;

determine one or more distortion costs associated with correcting a target reconstructed video frame of the reconstructed video data in a target correction mode according to the one or more candidate pixel threshold pairs;

screen, according to the one or more distortion costs, a target pixel threshold pair of the reconstructed video data, in the target correction mode, from the one or more candidate pixel threshold pairs; and obtain a target correction result of the reconstructed video data by correcting, in the target correction mode according to the target pixel threshold pair, one or more reconstructed video frames of the reconstructed video data.

* * * * *